United States Patent [19]
Kawamata et al.

[11] Patent Number: 5,825,549
[45] Date of Patent: Oct. 20, 1998

[54] OPTICAL THIN FILM FOR OPTICAL ELEMENT

[75] Inventors: Ken Kawamata, Urawa; Hiromu Ikeda, Tokyo, both of Japan

[73] Assignee: Olympus Optical Co., Ltd., Tokyo, Japan

[21] Appl. No.: 831,064

[22] Filed: Apr. 1, 1997

Related U.S. Application Data

[63] Continuation of Ser. No. 188,157, Jan. 27, 1994, abandoned.

[30] Foreign Application Priority Data

| Jan. 29, 1993 | [JP] | Japan | 5-034183 |
| Feb. 25, 1993 | [JP] | Japan | 5-060947 |
| Apr. 16, 1993 | [JP] | Japan | 5-113817 |
| May 19, 1993 | [JP] | Japan | 5-140186 |

[51] Int. Cl.$^6$ ............................................. G02B 1/10
[52] U.S. Cl. .................... 359/582; 359/583; 359/585; 359/589
[58] Field of Search .................... 359/582, 583, 359/589, 585, 580

[56] References Cited

U.S. PATENT DOCUMENTS

| 4,687,707 | 8/1987 | Matsuo et al. | 428/336 |
| 4,773,717 | 9/1988 | Pai et al. | 359/589 |
| 4,943,140 | 7/1990 | Woodard et al. | 359/585 |
| 4,973,511 | 11/1990 | Farmer et al. | 428/216 |
| 5,140,457 | 8/1992 | Letter | 359/359 |
| 5,189,551 | 2/1993 | Woodard | 359/585 |
| 5,190,807 | 3/1993 | Kimock et al. | 428/216 |
| 5,216,551 | 6/1993 | Fujii | 359/585 |
| 5,271,960 | 12/1993 | Proscia | 427/164 |
| 5,305,143 | 4/1994 | Taga et al. | 359/488 |

FOREIGN PATENT DOCUMENTS

| 60-28603 | 7/1983 | Japan | G02B 5/00 |
| 61-296305 | 6/1985 | Japan | G02B 5/28 |
| 62-191801 | 2/1986 | Japan | G02B 1/10 |

Primary Examiner—Jon W. Henry
Assistant Examiner—John Juba, Jr.
Attorney, Agent, or Firm—Ostrolenk, Faber, Gerb & Soffen, LLP

[57] ABSTRACT

An optical thin film for an optical element is disclosed, which includes at least one layer containing at least one compound selected from the group consisting of $MoO_3$ and $WO_3$. A material for use in evaporation coating to prepare a thin film includes a mixture of at least one compound selected from the group consisting of $MoO_3$ and $WO_3$ and another dielectric. A further optical thin film includes a substrate and superimposed thereon are alternate layers. One such alternative layer having a high refractive index, and composed of a material containing at least one compound selected from the group consisting of $MoO_3$ and $WO_3$. Another of such alternative layers having a low refractive index, and composed of $SiO_2$. Another thin film includes a substrate and, superimposed thereon, at least one dielectric layer. The at least one dielectric layer being at least one layer containing at least one compound selected from the group consisting of $MoO_3$ and $WO_3$, formed by vacuum evaporation coating.

11 Claims, 14 Drawing Sheets

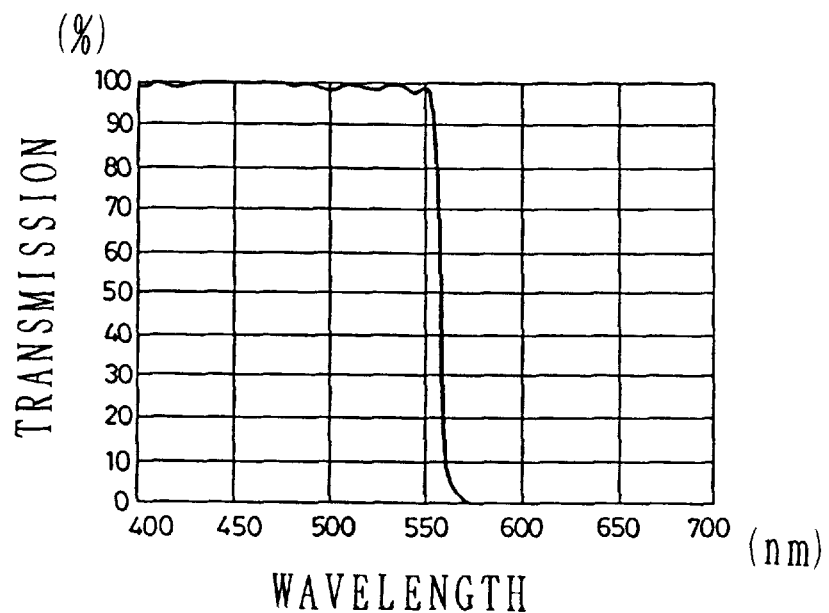
F I G. 14
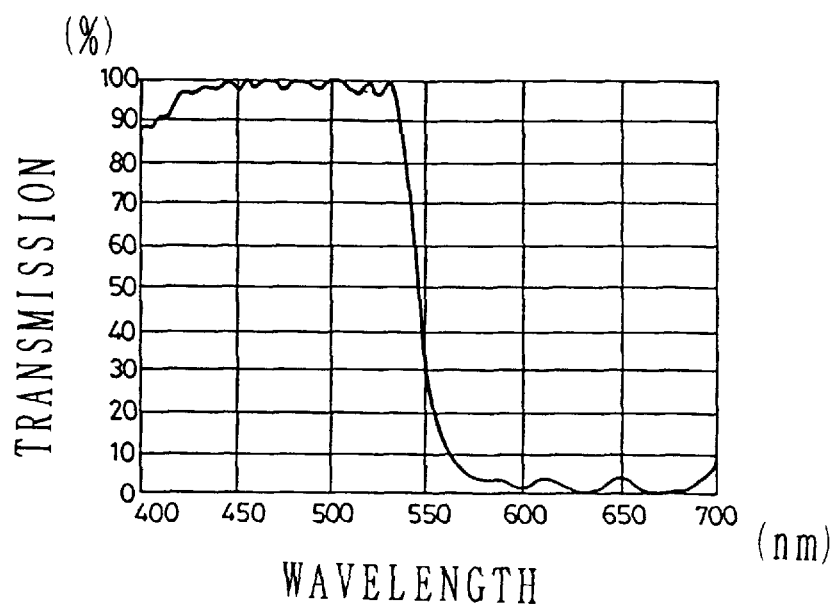
F I G. 15

F I G. 18
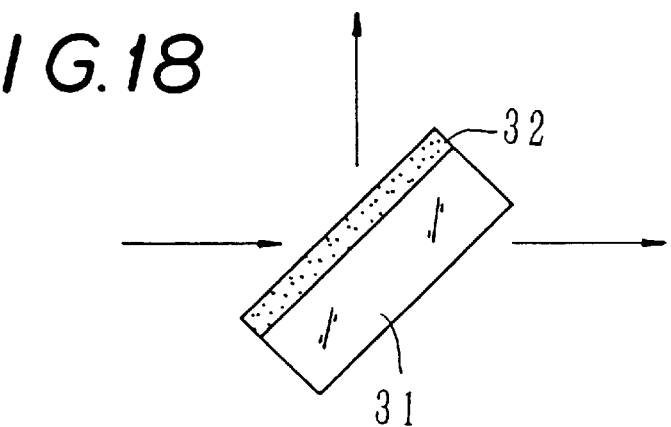
F I G. 19
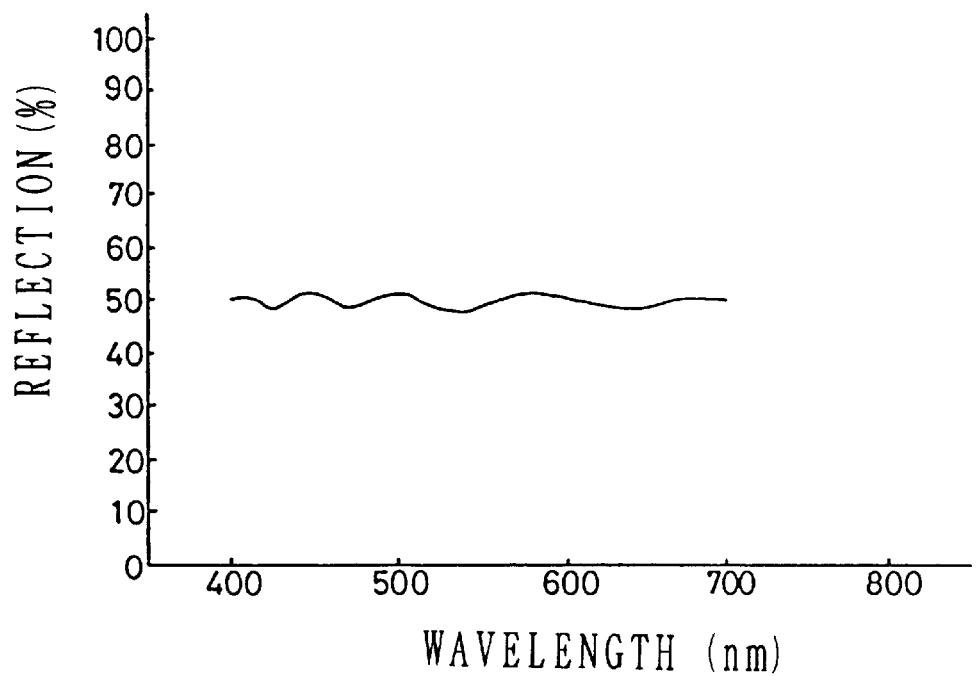
F I G. 20
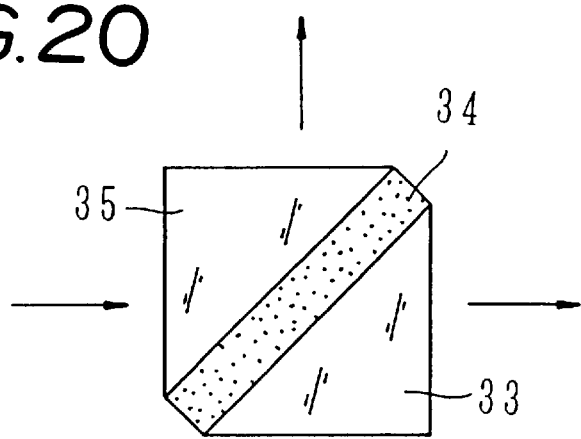

OPTICAL THIN FILM FOR OPTICAL ELEMENT

This is a continuation of application Ser. No. 08/188,157, filed on Jan. 27, 1994 now abandoned.

BACKGROUND OF THE INVENTION

1. Field of The Invention

The present invention relates to an optical thin film for an optical element and a material for use in evaporation coating to form the same. The optical thin film is, for example, an antireflection film which is incorporated in various optical parts, or used as an edge filter, a beam splitter, etc. The terminology "optical element" used herein means any unit capable of functioning in accordance with the optical principle, and comprehends optical parts comprising an antireflection film, an edge filter, a beam splitter, etc.

2. Discussion of Related Art

In recent years, resins are often used to produce a lens, a mirror, a prism and other optical parts. The optical parts composed of resins are superior to those composed of a glass in the formation of a complicated configuration and the attainment of cost and weight reductions. Especially, the former are advantageous as compared to the latter in that the processing is easier in the production of optical parts having complicated configurations.

For the optical parts composed of resins, formation of an optical thin film is often required as in the case of an optical glass.

The demand for mounting of an antireflection film or an edge filter onto an optical device, such as CCD, or an optical element comprising the device and, bonded thereto, a glass, is increasing in recent years. For meeting this demand, it is required that an optical thin film be appropriately formed on any predetermined surface.

A large number of proposals have been made relating to antireflection films for use in optical parts. For example, Japanese Patent Application Laid-Open Specification No. 191801/1987 discloses an antireflection film, which has a structure comprising four layers respectively composed of $SiO_2$, a mixture of $ZrO_2$ and $TiO_2$, $ZrO_2$ and SiO or $SiO_2$, arranged in this order from an air side to a substrate of a resin.

With respect to the edge filter, many proposals have been made in which a thin film is formed on a substrate of a glass. For example, an edge filter as disclosed in Japanese Patent Application Laid-Open Specification No. 296305/1986 has a structure comprising alternate layers of one with a high refractive index, composed of $TiO_2$, and one with a low refractive index, composed of $SiO_2$.

Few proposals have been made with respect to a beam splitter of a resin, but many proposals have been made with respect to a beam splitter of a glass. For example, Japanese Patent Application Laid-Open Specification No. 28603/1985 discloses a beam splitter structure comprising a first layer composed of $Al_2O_3$, a second layer composed of Ag and a third layer composed of $ZrO_2$, $TiO_2$, $CeO_2$, ZnS or the like.

For enabling an antireflection film or an edge filter to exhibit satisfactory optical performance, it is requisite to realize a structure comprising a combination of a high refractive index material and a low refractive index material. Further, for obtaining a beam splitter capable of exhibiting satisfactory optical performance over a broad wavelength range, it is requisite to employ a high refractive index material.

In the conventional technology, usually, $ZrO_2$, $TiO_2$, $CeO_2$, Zns or the like is used as a high refractive index material.

When a film of $TiO_2$ or $ZrO_2$ is formed on a substrate of a resin by means of the conventional evaporation coating apparatus as used in the coating of a substrate of a glass, since the melting points of the metal oxides are high, the resin substrate is heated by the radiation heat from the vapor source to such a degree that the surface of the resin substrate is damaged to lower the adhesion between the substrate and the film or degrade the surface precision of the substrate which is of utmost importance for the optical part. This is especially marked when the substrate is composed of an acrylic resin [e.g., PMMA (polymethyl methacrylate)].

Even if the substrate is composed of other materials than the resin, the problem of high temperatures cannot be obviated in optical parts, such as CCD, or units comprising the optical part and, bonded thereto, a glass. Illustratively stated, there i s the danger that, in the case of a semiconductor device, such as CCD, the device itself is damaged by high temperatures. Further, in bonded units, there is the danger that the bond strength is deteriorated or stripping occurs. Therefore, it is required that the film formation be conducted under conditions such that the adverse effect of the radiation heat from the vapor source is less.

Possible measures for decreasing the adverse effect of the radiation heat would be an increase of the distance between the vapor source and the substrate or providing a shield plate therebetween. These measures however require a substantial modification to the evaporation coating apparatus so that, disadvantageously, it is impossible to employ the conventional evaporation coating apparatus employed in the coating of a substrate of a glass, as it is. Further, when the above measures are employed, the evaporation coating time would inevitably be prolonged to a disadvantage from the viewpoint of productivity.

Instead of the above measures, if a material whose radiation heat is low is used as a vapor source, the above problems would be resolved. $CeO_2$ and ZnS are such materials. However, $CeO_2$ has drawbacks in that it is not only likely to contract a flaw and poor in moisture resistance but also exhibits a high absorption in a short wavelength range. Than $CeO_2$, ZnS is weaker and more likely to contract a flaw, and further poorer in moisture resistance so as to become soluble in water. When a film of ZnS is allowed to stand in the air, it suffers from a disadvantageous change in properties.

Moreover, if the conventional film structure as disposed on a substrate of a glass is applied as it is to a substrate of a resin, the film suffers from an intense stress because the expansion coefficient of the resin substrate is greater than that of the glass substrate, so that the film is likely to be cracked.

Therefore, none of the conventional optical thin films for optical elements has fully desirable properties.

SUMMARY OF THE INVENTION

With a view toward obviating the above drawbacks of the prior art, the inventors have made extensive and intensive studies. As a result, they have unexpectedly found that the desired thin film can be obtained by the incorporation of a layer containing $MoO_3$, $WO_3$ or a mixture thereof. Based on this unexpected finding, the present invention has been completed.

It is, therefore, an object of the present invention to provide a thin film for an optical element which is excellent in durability, especially, moisture resistance, and which can be easily formed on a substrate of a resin or a substrate comprising an optical part, such as CCD, and, bonded therewith, a glass with high productivity by the conventional apparatus for evaporation coating while ensuring a high adhesion between the film and the substrate without degrading the surface precision of the substrate and without causing the substrate to suffer from thermal damage.

It is another object of the present invention to provide a material for use in evaporation coating to form the above thin film.

The foregoing and other objects, features and advantages of the present invention will become apparent from the following detailed description and appended claims taken in connection with the accompanying drawings.

BRIEF DESCRIPTION OF THE DRAWINGS

FIG. 14 is a graph showing the transmission of the edge filter of Example 25 according to the present invention as a function of wavelength;

FIG. 15 is a graph showing the transmission of the edge filter of Example 26 according to the present invention as a function of wavelength;

FIG. 18 is a diagrammatic view showing the structure of the beam splitter obtained in Example 27 according to the present invention;

FIG. 19 is a graph showing the reflection of the beam splitter of Example 27 according to the present invention as a function of wavelength;

FIG. 20 is a diagrammatic view showing the structure of the beam splitter obtained in Example 29 according to the present invention;

DETAILED DESCRIPTION OF THE INVENTION

Figure 1:
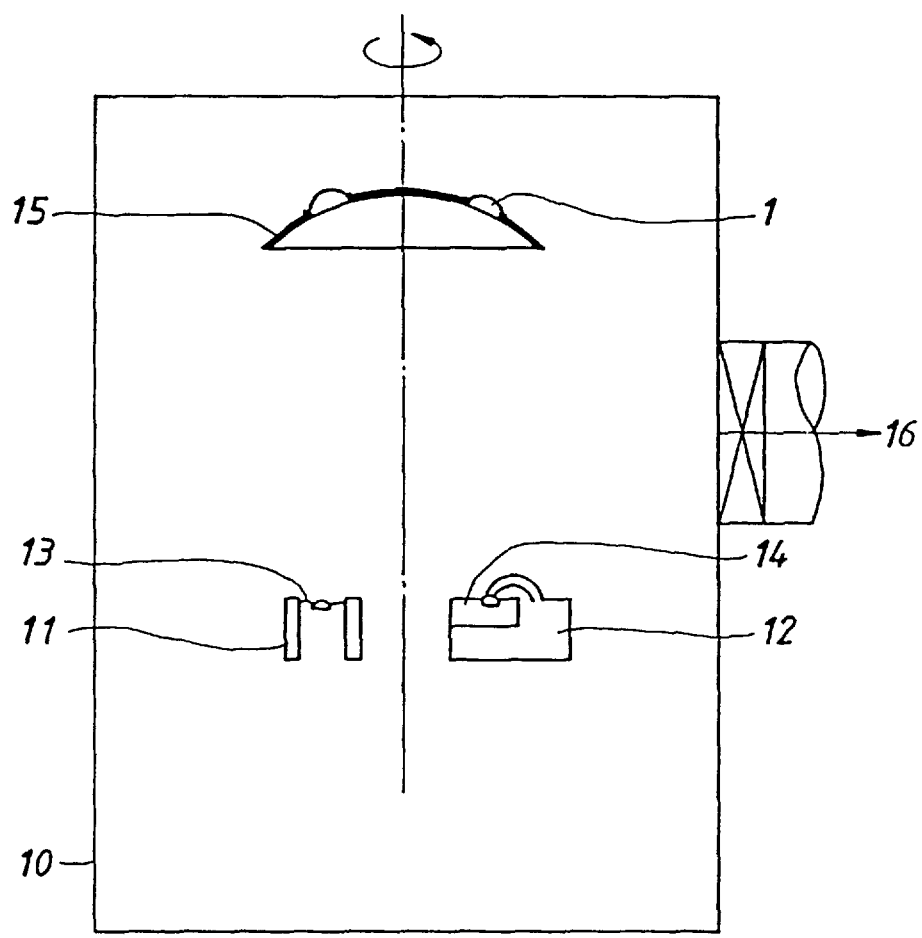
FIG. 1 is a schematic diagram of an apparatus for vacuum evaporation coating employed in an embodiment of the present invention.

In a principal aspect of the present invention, there is provided an optical thin film for an optical element, comprising at least one layer containing at least one compound selected from the group consisting of $MoO_3$ and $WO_3$.

In the present invention, in order to resolve the drawbacks of the prior art, $MoO_3$, $WO_3$ or a mixture thereof is utilized as a high refractive index material for permitting the radiation heat from the vapor source to be low.

Neither $MoO_3$ nor $WO_3$ has been noted as a material for an optical thin film. The inventors have found that $MoO_3$ and $WO_3$ are materials easily evaporated with low energy, so that the radiation heat from the vapor source can be kept low, thereby enabling the substrate to be free from thermal damage. Further, the inventors have found that $MoO_3$ and $WO_3$ are less likely to contract a flaw and exhibits greater moisture resistance than the conventional $CeO_2$ and ZnS. Still further, the inventors have found that, in the completely oxidized state, $MoO_3$ and $WO_3$ exhibit little light absorption in the visible radiation range, for example an absorption as small as only 2% or less at 400 nm while the refractive index thereof is as high as about 1.85 to 2.1 (depending on film formation conditions). Therefore, the inventors have recognized that $MoO_3$ and $WO_3$ are suitable high refractive index materials for forming a high performance optical thin film.

In the formation of an optical thin film from $MoO_3$ and $WO_3$, mixtures may be employed, which include a mixture of $MoO_3$ and $WO_3$, a mixture of $MoO_3$ and another dielectric, a mixture of $WO_3$ and another dielectric, and a mixture of $MoO_3$, $WO_3$ and another dielectric. It has been found that the mixture with $SiO_2$ as the other dielectric is preferred from the viewpoint that the heat cycle resistance and mechanical strength are improved.

When the optical thin film comprising $MoO_3$ or $WO_3$ is exposed to high humidity for a prolonged period of time, the adhesion between the film and the substrate is likely to unfavorably decrease. This can be resolved by providing the optical thin film with a water repellent layer as a top surface layer. The water repellent layer prevents the penetration of moisture into an inner part of the thin film to thereby avoid the adhesion decrease.

The material and method for forming the water repellent layer are not particularly limited as long as desirable water repellency and durability are ensured. For example, the water repellent layer may be formed by evaporation coating comprising evaporating only the oil component from a porous material impregnated with fluorinated silicone oil, or may be comprised of a fluorinated polymer film obtainable using an evaporation coating material of a fluororesin or fluorine gas, such as films of polytetrafluoroethylene (PTFE), polyfluoroalkyl methacrylates, polytrifluoroethylene, perfluoroalkylsilane polymers and perfluoroalkylacetylene polymers. The thickness of the water repellent layer is not limited. It may be so large as to share the function of the optical thin film, e.g., in the range of about 20 to 250 nm in terms of optical film thickness. Alternatively, the water repellent layer may have such a thickness as to have no optical effect, e.g., in the range of about 1 to 10 nm in terms of optical film thickness.

When the employed substrate is composed of a resin, the thin film is likely to suffer from cracks. The occurrence of the cracks can be coped with by providing a silicon oxide layer having an optical thickness of at least 2 nm as a first layer on the substrate. Any compound of the formula $SiOx$ (wherein x is from 1 to 2) may be used to form the silicon oxide layer. The first silicon oxide layer acts to relax the stress exerted on the thin film by the expansion or shrinkage of the substrate to thereby prevent the cracks. When the optical film thickness is smaller than 2 nm, however, the above action is not satisfactory, so that cracks are likely to occur on the thin film in the heat cycle test thereof.

When an evaporation coating by means of electron beams is performed using $MoO_3$ or $WO_3$ as an evaporation coating material, it is likely that the electron beams are reflected so as to cause the heating of the evaporation coating material to be difficult. The reflection of the electron beams can be suppressed by adding a small amount of another dielectric to $MoO_3$, $WO_3$ or a mixture thereof. Further, the addition of another dielectric is effective for preventing the cracking or splashing of the evaporation coating material in the form of pellets. It has been confirmed that not only the above-mentioned $SiO_2$ but also any member selected from the group consisting of $Al_2O_3$, $ZrO_2$, $Ta_2O_5$ and $TiO_2$ is suitable as the above other dielectric. These dielectrics have high melting points, so that, in the evaporation coating, vapor pressures are greatly different between them and $MoO_3$, $WO_3$ or a mixture thereof to thereby cause only $MoO_3$, $WO_3$ or a mixture thereof to be present in the evaporation-coated thin film. The high melting point dielectric is added in an amount of at least 1% by weight, which ensures desired effect. By the use of this evaporation coating material, the desired optical thin film can be formed with high productivity by means of the conventional apparatus for evaporation coating.

In the present invention, the scope of the substrate is broad, and it includes plates of not only an optical glass but also synthetic resins, such as acrylic resins, polycarbonates, amorphous polyolefins, CR-39 and energy-curable resins, and further includes optical devices and parts which should not be exposed to high temperatures, such as CCD, and units comprising these and, bonded thereto, a glass. In the formation of the optical thin film on the substrate, the conventional vacuum evaporation coating is preferably employed.

As described above, the present invention provides a thin film for an optical element which is excellent in durability, and which can be easily formed on a substrate with high productivity by the conventional apparatus for evaporation coating while ensuring a high adhesion between the film and the substrate without degrading the surface precision of the substrate and without causing the substrate to suffer from thermal damage.

In particular, with respect to an antireflection film applied to a substrate of a resin, the employment of the layer containing at least one compound selected from the group consisting of $MoO_3$ and $WO_3$ as a high refractive index layer permits the production thereof by the conventional apparatus for evaporation coating having no modification thereto while keeping the radiation heat from the vapor source low without causing the surface of the substrate to damage to have poor adhesion with the film and poor surface precision.

If the antireflection film comprises a first layer of a silicon oxide having an optical thickness of at least 2 nm disposed on the substrate and, superimposed thereon, the above-mentioned layer containing at least one compound selected from the group consisting of $MoO_3$ and $WO_3$, it exhibits improved durability, especially heat cycle resistance.

The employment of the material for evaporation coating to prepare an optical thin film according to the present invention, comprising a mixture of at least one compound selected from the group consisting of $MoO_3$ and $WO_3$ and another dielectric, is advantageous in that the heat cycle resistance and other optical properties can be improved, and that the reflection of electron beam is suppressed so that evaporation coating can be easily performed with an electron gun to thereby permit formation of the layer containing at least one compound selected from the group consisting of $MoO_3$ and $WO_3$ according to the efficient electron beam process.

The antireflection film of the present invention is preferably provided with a water repellent layer as a top surface layer. The water repellent layer blocks the penetration of moisture into an inner part of the antireflection film, so that the moisture resistance which is relatively low when at least one compound selected from the group consisting of $MoO_3$ and $WO_3$ is incorporated, can be remarkably improved.

With respect to an edge filter (such as a high pass filter, a low pass filter and a band pass filter) as well, the employment of the layer containing at least one compound selected from the group consisting of $MoO_3$ and $WO_3$ as a high refractive index layer permits an efficient production thereof by the conventional apparatus for evaporation coating having no modification thereto while keeping the radiation heat from the vapor source low without causing the surface of the substrate to suffer from thermal damage to have poor adhesion with the film and poor surface precision, resulting in poor device performance. The edge filter is excellent in durability, especially heat cycle resistance.

Preferably, the edge filter comprises a substrate and, superimposed thereon, alternate layers of one with a high refractive index, composed of a material containing at least one compound selected from the group consisting of $MoO_3$ and $WO_3$, and one with a low refractive index, composed of $SiO_2$.

Also, with respect to a beam splitter, the employment of the layer containing at least one compound selected from the group consisting of $MoO_3$ and $WO_3$, formed by vacuum evaporation coating, as a high refractive index layer permits an efficient production thereof by the conventional apparatus for evaporation coating while ensuring a high adhesion between the film and the substrate, irrespective of being composed of a glass or a resin, without causing the substrate to suffer from poor surface precision or other thermal damage.

A beam splitter having excellent heat cycle resistance is obtained by causing the same to comprise a substrate and, superimposed thereon, a plurality of dielectric layers, the dielectric layers including a first layer of a silicon oxide adjacent to the substrate, the first layer preferably having a thickness of at least 2 nm, and at least one layer containing at least one compound selected from the group consisting of $MoO_3$ and $WO_3$, formed by vacuum evaporation coating.

The beam splitter is preferably provided with a water repellent layer as a top surface layer so that improved moisture resistance is exhibited.

PREFERRED EMBODIMENT OF THE INVENTION

The present invention will now be described in greater detail with reference to the following Examples and Comparative Examples, which should not be construed as limiting the scope of the present invention.

EXAMPLE 1

The antireflection film having the layer structure indicated in Table 1, i.e., composed of alternate layers of $MoO_3$ and $SiO_2$ was formed on a resin substrate of polymethyl methacrylate (PMMA) having a refractive index of 1.49, using the apparatus for vacuum evaporation coating as illustrated in FIG. 1. In FIG. 1, numeral 10 denotes a vacuum chamber, in which a vapor source 11 which generates vapor by resistance heating and a vapor source 12 which generates vapor by an electron gun are disposed low. Numeral 13 denotes a melt boat for resistance heating, mounted on the vapor source 11. Numeral 14 denotes copper crucibles with liner of the vapor source 12. On the other hand, high in the vacuum chamber 10, a rotary dome 15 rotatable around an axis is disposed, on which a substrate 1 is mountable. Numeral 16 denotes a vacuum exhaust pipe connected to a vacuum pump not shown. The distance between the substrate 1 and each of the vacuum sources 11, 12 is 520 nm. As apparent from the above description, the apparatus has no difference from that conventionally employed for forming an antireflection film on a glass substrate.

The antireflection film having the layer structure indicated in Table 1 was formed using the apparatus of FIG. 1, as follows.

The layers of $MoO_3$ were formed by putting granular $MoO_3$ in the boat 13 composed of Mo and evaporating the same by resistance heating while introducing oxygen gas until the total pressure thereof became $2 \times 10^{-4}$ Torr.

The layers of $SiO_2$ were formed by putting granular $SiO_2$ in the copper crucibles with liner 14 and evaporating the same by electron beams.

Figure 2:
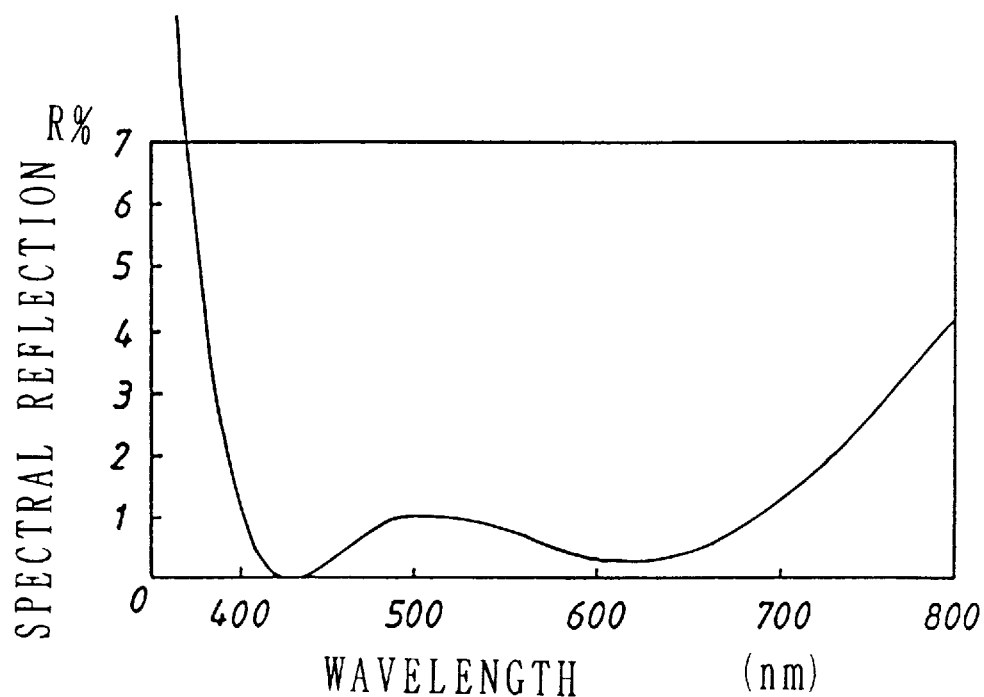
FIG. 2 is a graph showing the spectral reflection of the antireflection film of Example 1 according to the present invention as a function of wavelength.

The spectral reflection of the thus formed antireflection film was measured to obtain the graph of FIG. 2. The graph shows that the antireflection film has properties satisfactory for application to a resin substrate.

Further, the conventional peeling test using a cellophane tape was conducted to show a good adhesion between the substrate and the oxide layers. The substrate had no surface precision change.

In this Example, oxygen gas was introduced during the film formation in order to prevent $MoO_3$ from undergoing dissociation to cause oxygen-deficient condition, so that visible light would be absorbed. It was found that similar favorable results were obtained by the employment of oxygen plasma or oxygen ion beams instead of the above.

EXAMPLE 2

Figure 3:
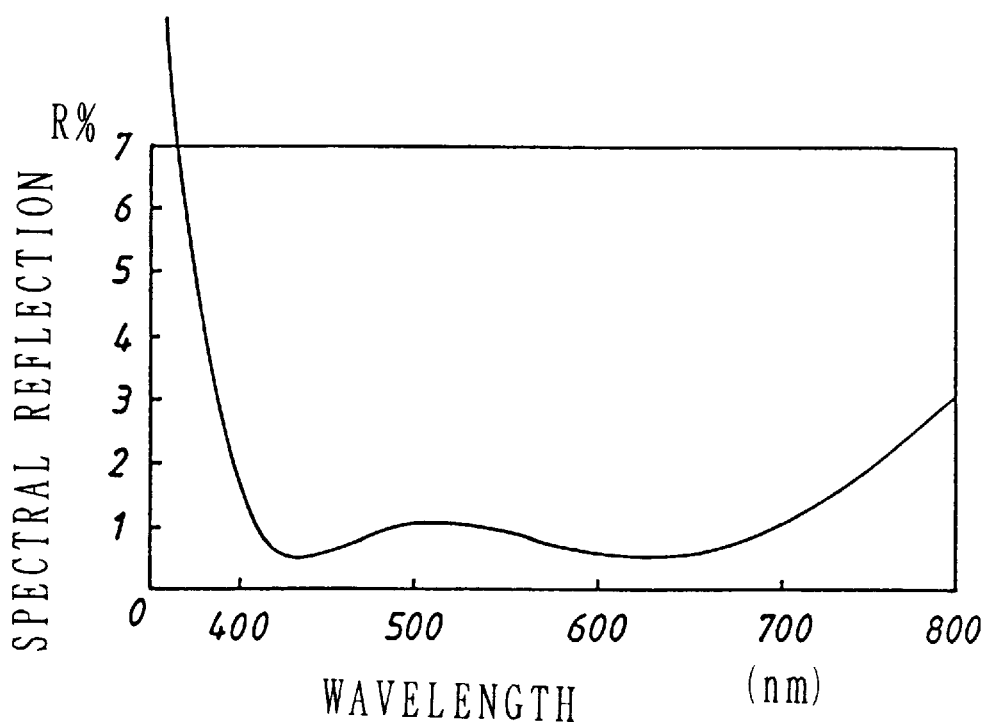
FIG. 3 is a graph showing the spectral reflection of the antireflection film of Example 2 according to the present invention as a function of wavelength.

The antireflection film having the layer structure indicated in Table 2 was formed using the apparatus of FIG. 1 in the same manner as in Example 1, except that $WO_3$ as an evaporation coating material was put in the boat composed of W. The spectral reflection of the antireflection film was satisfactory as shown in FIG. 3, and the adhesion between the substrate and the oxide layer s was excellent.

EXAMPLE 3

The antireflection film having the layer structure indicated in Table 3 was formed using the apparatus of FIG. 1. Each of the 2nd and 4th layers was formed by putting granules of a 2:1 by weight mixture of powdery $MoO_3$ and $WO_3$ in the boat 13 composed of Mo and evaporating the same by resistance heating while introducing oxygen gas until the total pressure thereof became $8 \times 10^{-5}$ Torr.

Figure 4:
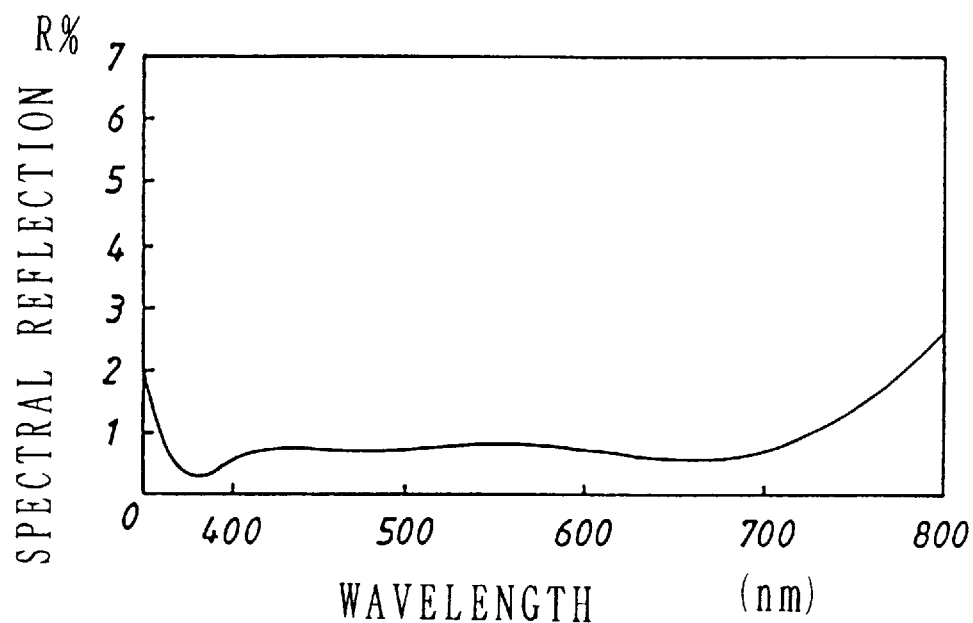
FIG. 4 is a graph showing the spectral reflection of the antireflection film of Example 3 according to the present invention as a function of wavelength.

The spectral reflection of the antireflection film was satisfactory as shown in FIG. 4, and the adhesion between the substrate and the oxide layers was excellent.

The refractive indexes of the layers can be regulated by varying the mixing ratio of $MoO_3$ to $WO_3$.

EXAMPLE 4

The antireflection film having the layer structure indicated in Table 4 was formed using the apparatus of FIG. 1. The first layer of SiO was formed by putting SiO as an evaporation coating material in the boat 13 composed of Mo and evaporating the same by resistance heating while introducing oxygen gas. The second layer of $MoO_3$ was formed by putting pellets of a mixture of 97 to 98% by weight of powdery $MoO_3$ and 2 to 3% by weight of powdery $Al_2O_3$ in the copper crucibles with liner 14 and evaporating the same by electron beams. The third layer of $SiO_2$ was formed by putting $SiO_2$ granules in the copper crucibles with liner 14 and evaporating the same by electron beams.

Figure 5:
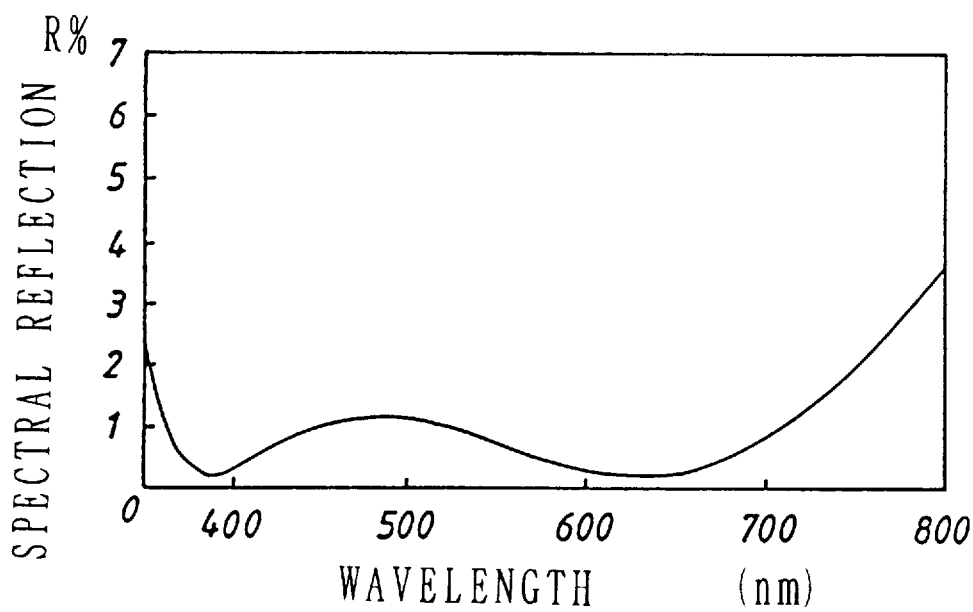
FIG. 5 is a graph showing the spectral reflection of the antireflection film of Example 4 according to the present invention as a function of wavelength.

The spectral reflection of the antireflection film was satisfactory as shown in FIG. 5, and the adhesion between the substrate and the oxide layers was excellent. In this Example, $MoO_3$ having a small amount of $Al_2O_3$ added thereto was used as an evaporation coating material, so that reflection of electron beams was prevented to facilitate the heating of the evaporation coating material by the electron gun. The addition of $ZrO_2$, $Ta_2O_5$ or $TiO_2$ instead of $Al_2O_3$ produced similar effect. Also, similar effect would be obtained by the addition of many other high melting point oxides.

EXAMPLE 5

The antireflection film having the layer structure indicated in Table 5, i.e., composed of alternate layers of $SiO_2$ and a mixture of $MoO_3$ and $SiO_2$, was formed on a resin substrate of polycarbonate (PC) having a refractive index of 1.58.

The layer of a mixture of $MoO_3$ and $SiO_2$ was formed by putting a 4:1 by weight mixture of granules of $MoO_3$ and SiO$_2$ as an evaporation coating material in the copper crucibles with liner 14 and evaporating the same by electron beams while introducing oxygen gas at a pressure of 1×10$^{-4}$ Torr.

Figure 6:
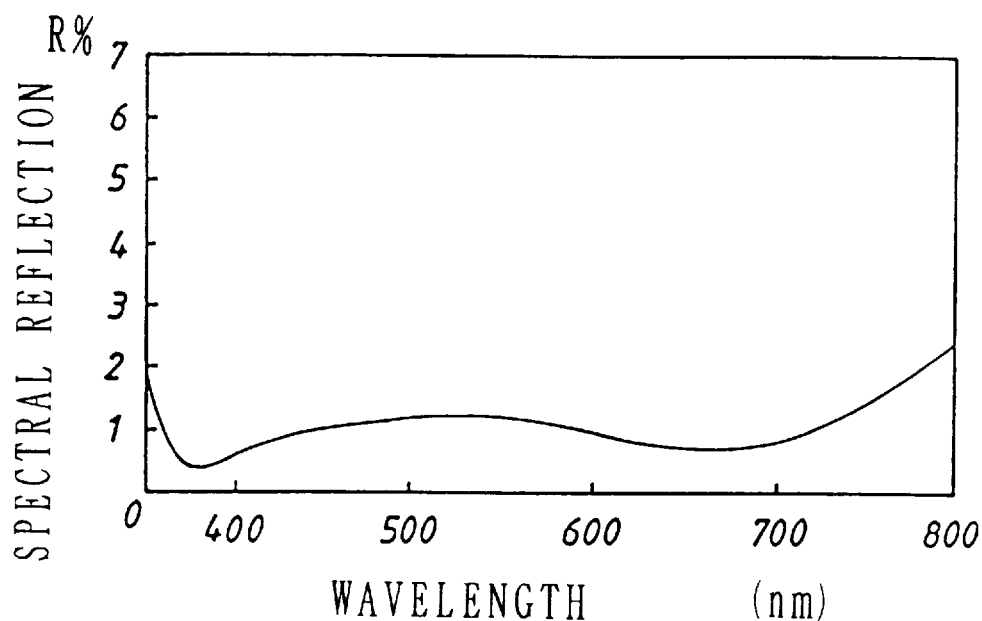
FIG. 6 is a graph showing the spectral reflection of the antireflection film of Example 5 according to the present invention as a function of wavelength.

The spectral reflection of the thus formed antireflection film was satisfactory as shown in FIG. 6, and the adhesion between the substrate and the oxide layers was excellent.

In the antireflection film of this Example, MoO$_3$ was mixed with SiO$_2$, so that the heat cycle resistance was excellent. Illustratively stated, no problems of adhesion deterioration or cracking occurred irrespective of 20 heat cycles each comprising holding at 20° C. for 1 hr, at 40° C. for 1 hr, at 20° C. for 1 hr and at 70° C. for 1 hr.

Similar effect was obtained when the SiO$_2$ content of the mixture was not less than 10% by weight. The refractive index was variable by varying the SiO$_2$ content. It was confirmed that an antireflection film being excellent in durability, especially heat cycle resistance, could be obtained by the use of a layer of a mixture of WO$_3$ and SiO$_2$.

EXAMPLE 6

The antireflection film having the layer structure indicated in Table 6, i.e., composed of alternate layers of WO$_3$ and SiO$_2$ was formed on the surface of a resin substrate of polymethyl methacrylate (PMMA) having a refractive index of 1.49, using the apparatus of FIG. 1. The layers of WO$_3$ were formed by heating pellets thereof by the electron gun. The layers of SiO$_2$ were formed by putting SiO$_2$ granules in the copper crucibles with liner 14 and heating the same by the electron gun.

Figure 7:
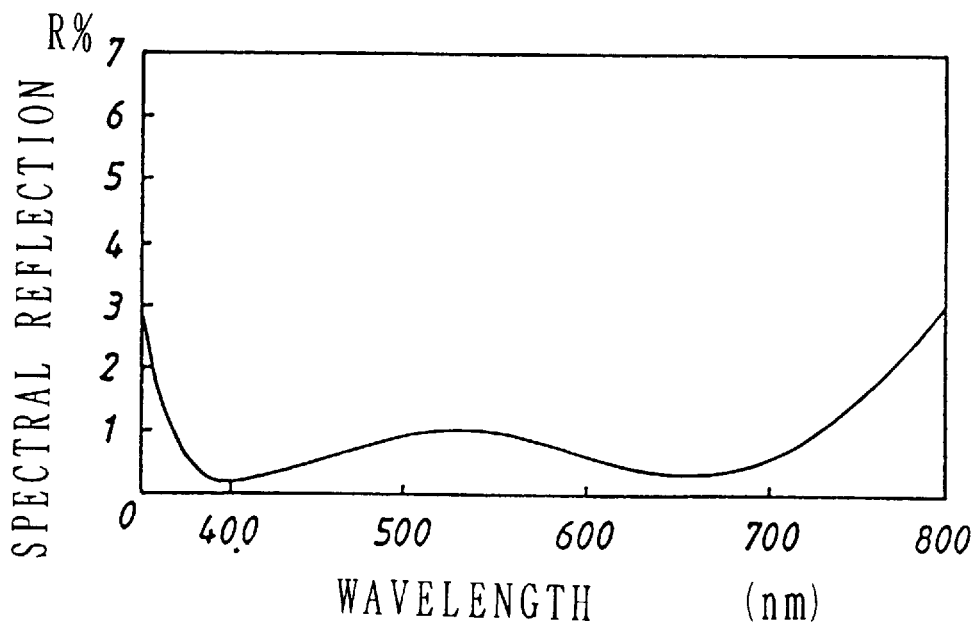
FIG. 7 is a graph showing the spectral reflection of the antireflection film of Example 6 according to the present invention as a function of wavelength.

The spectral reflection of the thus formed antireflection film was measured to obtain the graph of FIG. 7. The graph shows that the antireflection film has properties satisfactory for application to a resin substrate.

Further, the conventional peeling test using a cellophane tape was conducted to show a good adhesion between the substrate and the oxide layers. The substrate had no surface precision change.

A heat cycle test was conducted of the thus formed antireflection film. No problems of adhesion deterioration or cracking occurred irrespective of 20 heat cycles each comprising holding at 20° C. for 1 hr, at 40° C. for 1 hr, at 20° C. for 1 hr and at 70° C. for 1 hr.

EXAMPLE 7

Antireflection films having the same layer structure as in Example 6 except that the first layer was not provided or the thickness of the first layer was varied as indicated in Table 7 were formed, and subjected to adhesion and heat cycle resistance tests. The results are shown in Table 7. With respect to the antireflection film devoid of the first layer of SiO$_2$, unfavorably, visually clearly observable cracks occurred on the entire surface. With respect to the antireflection films in which the first layer of SiO$_2$ had an optical thickness of 5 nm or greater, no cracks occurred at all. With respect to the antireflection film in which the first layer of SiO$_2$ had an optical thickness of 2 nm, cracks were not visually observable, but the occurrence of cracks was found by the use of an optical microscope (magnification: 50fold). The occurrence of cracks was, however, on such a level as caused no problem in optical characteristics. Therefore, it is desired that the first layer of SiO$_2$ have an optical thickness of at least 2 nm, preferably at least 5 nm. This was true not only in this Example but also with respect to other layer structures and other types of resin substrates.

The reason for the above occurrence of cracks by the heat cycle test would be that while the resin substrate repeats expansion and shrinkage during the test, MoO$_3$ and WO$_3$ cannot, thereby producing an intense stress which finally leads to cracking. It is believed that the first layer of SiO$_2$ acts to relax the above stress, so that cracking can be prevented.

EXAMPLE 8

The antireflection film having the layer structure indicated in Table 8 was formed using the apparatus of FIG. 1. The first layer of SiO was formed by putting SiO as an evaporation coating material in the boat 13 composed of Mo and evaporating the same by resistance heating. Each of the second and fourth layers of WO$_3$ and the third and fifth layers of SiO$_2$ was formed by the heating in the same manner as in Example 6 using the electron gun. During the formation of each of the 1st to 5th layers, oxygen gas was introduced at a pressure of 2×10$^{-4}$ Torr.

Figure 8:
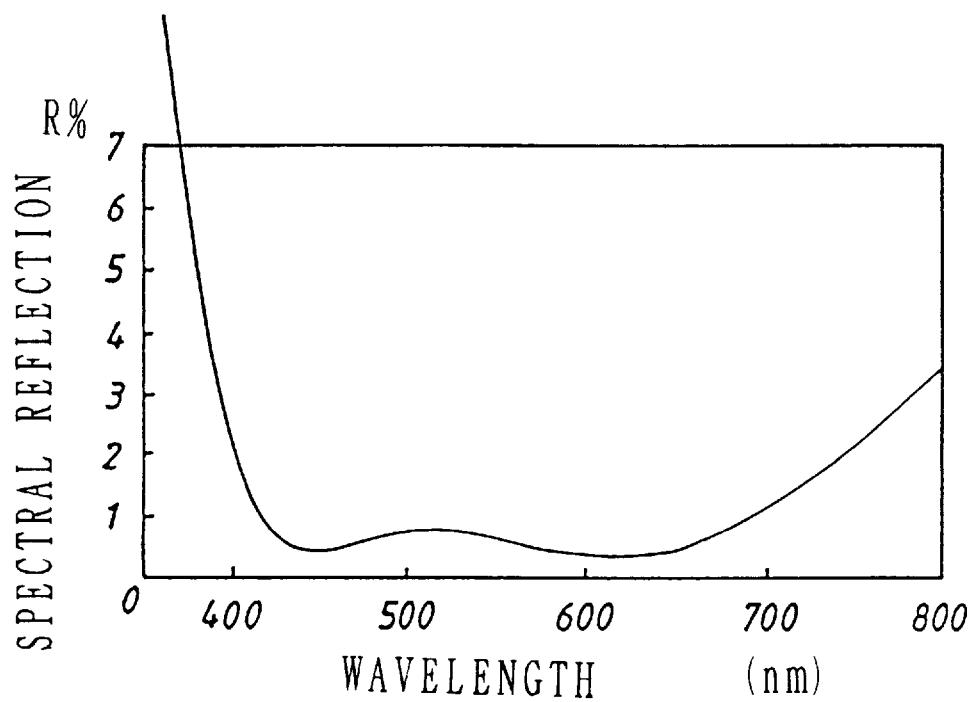
FIG. 8 is a graph showing the spectral reflection of the antireflection film of Example 8 according to the present invention as a function of wavelength.

The spectral reflection of the thus formed antireflection film was satisfactory as shown in FIG. 8, and the adhesion between the substrate and the oxide layers was excellent. In the heat cycle test, neither cracking nor adhesion deterioration was observed.

EXAMPLE 9

The same procedure as in Example 8 was repeated except that WO$_3$ was replaced by MoO$_3$. As a result, an antireflection film was obtained, which exhibited an excellent adhesion between the substrate and the oxide layers and did not crack in the heat cycle test.

EXAMPLES 10 to 13

In all of the above Examples, the antireflection film was formed on the acrylic resin substrate. Examples in which other substrates were used are summarized in Table 9. As shown in the table, all of the antireflection films exhibited excellent adhesion between the substrate and the oxide layers, and did not crack in the heat cycle test.

TABLE 1

Antireflection Film of Example 1

| | Material | Refractive index n | Optical film thickness nd [nm] |
|---|---|---|---|
| 4th layer | SiO$_2$ | 1.46 | 135 |
| 3rd layer | MoO$_3$ | 2.00 | 110 |
| 2nd layer | SiO$_2$ | 1.46 | 40 |
| 1st layer | MoO$_3$ | 2.00 | 65 |
| Substrate | PMMA | 1.49 | — |

TABLE 2

Antireflection Film of Example 2

| | Material | Refractive index n | Optical film thickness nd [nm] |
|---|---|---|---|
| 5th layer | SiO$_2$ | 1.46 | 140 |
| 4th layer | WO$_3$ | 1.85 | 120 |
| 3rd layer | SiO$_2$ | 1.46 | 40 |
| 2nd layer | WO$_3$ | 1.85 | 60 |
| 1st layer | SiO$_2$ | 1.46 | 35 |
| Substrate | PMMA | 1.49 | — |

TABLE 3

Antireflection Film of Example 3

| | Material | Refractive index n | Optical film thickness nd [nm] |
|---|---|---|---|
| 5th layer | $SiO_2$ | 1.46 | 120 |
| 4th layer | $MoO_3 + WO_3$ | 1.95 | 260 |
| 3rd layer | $SiO_2$ | 1.46 | 50 |
| 2nd layer | $MoO_3 + WO_3$ | 1.95 | 30 |
| 1st layer | $SiO_2$ | 1.46 | 20 |
| Substrate | PMMA | 1.49 | — |

TABLE 4

Antireflection Film of Example 4

| | Material | Refractive index n | Optical film thickness nd [nm] |
|---|---|---|---|
| 3th layer | $SiO_2$ | 1.46 | 120 |
| 2nd layer | $MoO_3$ | 2.00 | 240 |
| 1st layer | SiO | 1.60 | 120 |
| Substrate | PMMA | 1.49 | — |

TABLE 5

Antireflection Film of Example 5

| | Material | Refractive index n | Optical film thickness nd [nm] |
|---|---|---|---|
| 5th layer | $SiO_2$ | 1.46 | 120 |
| 4th layer | $MoO_3 + SiO_2$ | 1.90 | 270 |
| 3rd layer | $SiO_2$ | 1.46 | 50 |
| 2nd layer | $MoO_3 + SiO_2$ | 1.90 | 40 |
| 1st layer | $SiO_2$ | 1.46 | 40 |
| Substrate | PC | 1.58 | — |

TABLE 6

Antireflection Film of Example 6

| | Material | Refractive index n | Optical film thickness nd [nm] |
|---|---|---|---|
| 5th layer | $SiO_2$ | 1.46 | 120 |
| 4th layer | $WO_3$ | 2.05 | 260 |
| 3rd layer | $SiO_2$ | 1.46 | 50 |
| 2nd layer | $WO_3$ | 2.05 | 25 |
| 1st layer | $SiO_2$ | 1.46 | 20 |
| Substrate | PMMA | 1.49 | — |

TABLE 7

Antireflection Films of Example 7

| Optical film thickness nd (nm) of 1st layer ($SiO_2$) | Initial adhesion | Heat cycle test |
|---|---|---|
| 0 | ○ | X Visually observable cracks occurred on the entire surface. |
| 1.0 | ○ | X Visually observable cracks occurred on the entire surface. |
| 1.8 | ○ | X Visually observable cracks occurred partially on the surface. |
| 2.0 | ○ | Δ Cracks observable by an optical microscope (magnification: 50 fold) occurred. |
| 5.0 | ○ | ○ No cracks. |
| 10.0 | ○ | ○ No cracks. |
| 40.0 | ○ | ○ No cracks. |

TABLE 8

Antireflection Film of Example 8

| | Material | Refractive index n | Optical film thickness nd [nm] |
|---|---|---|---|
| 5th layer | $SiO_2$ | 1.46 | 140 |
| 4th layer | $WO_3$ | 1.90 | 120 |
| 3rd layer | $SiO_2$ | 1.46 | 40 |
| 2nd layer | $WO_3$ | 1.90 | 55 |
| 1st layer | SiO | 1.51 | 30 |
| Substrate | PMMA | 1.49 | — |

TABLE 9

Antireflection Films of Examples 10–13

| | | Example 10 | | | Example 11 | | |
|---|---|---|---|---|---|---|---|
| 6th layer | | | | | | | |
| 5th layer | $SiO_2$ | n = 1.46 | nd = 130 nm | $SiO_2$ | n = 1.46 | nd = 120 nm | |
| 4th layer | $WO_3$ | n = 1.97 | nd = 280 nm | $WO_3$ | n = 2.05 | nd = 260 nm | |
| 3rd layer | $SiO_2$ | n = 1.46 | nd = 50 nm | $SiO_2$ | n = 1.46 | nd = 50 nm | |
| 2nd layer | $WO_3$ | n = 1.97 | nd = 30 nm | $WO_3$ | n = 2.05 | nd = 25 nm | |
| 1st layer | $SiO_2$ | n = 1.46 | nd = 8 nm | $SiO_2$ | n = 1.46 | nd = 30 nm | |
| Substrate | Polycarbonate | n = 1.58 | — | UV-cured resin | n = 1.52 | — | |
| Initial adhesion | | OK | | | OK | | |

TABLE 9-continued

Antireflection Films of Examples 10–13

| | | | | | | | |
|---|---|---|---|---|---|---|---|
| After heat cycle test | No cracks. | | | No cracks. | | | |

| | | Example 12 | | | Example 13 | | |
|---|---|---|---|---|---|---|---|
| 6th layer | $SiO_2$ | n = 1.46 | nd = 120 nm | | | | |
| 5th layer | $MoO_3$ | n = 2.00 | nd = 265 nm | | | | |
| 4th layer | $SiO_2$ | n = 1.46 | nd = 50 nm | | | | |
| 3rd layer | $MoO_3$ | n = 2.00 | nd = 25 nm | $SiO_2$ | n = 1.46 | nd = 130 nm | |
| 2nd layer | $SiO_2$ | n = 1.46 | nd = 10 nm | $WO_3$ | n = 2.05 | nd = 260 nm | |
| 1st layer | SiO | n = 1.55 | nd = 2 nm | $SiO_2$ | n = 1.60 | nd = 120 nm | |
| Substrate | UV-cured resin | n = 1.52 | — | CR-39 | n = 1.52 | — | |
| Initial adhesion | | OK | | | OK | | |
| After heat cycle test | | No cracks. | | | No cracks. | | |

EXAMPLE 14

Using the apparatus for vacuum evaporation coating as diagrammatically shown in FIG. 1, the antireflection film having the layer structure indicated in Table 10 was formed on the surface of a resin substrate of polymethyl methacrylate (PMMA) having a refractive index of 1.49, which film was composed of five alternate layers of $SiO_2$ and $WO_3$, the layers being provided on their top with a water repellent layer having an optically noninfluential thickness.

The above antireflection film was formed using the apparatus of FIG. 1, as follows.

The substrate 1 of the acrylic resin was mounted on the rotary dome 15, and the vacuum chamber 10 was evacuated to a pressure of $3\times10^{-6}$ Torr by means of an oil diffusion pump (not shown). Each of the $SiO_2$ layers was formed by putting granule s of $SiO_2$ in the copper crucibles with liner 14 and heating the same by the electron gun. On the other hand, each of the $WO_3$ layers was formed by heating pellets of $WO_3$ having a small amount (5% by weight) of $Al_2O_3$ added thereto by the electron gun to evaporate the same while introducing oxygen gas up to a pressure of $1\times10^{-5}$ Torr.

The vapor pressure of $Al_2O_3$ is far lower than that of $WO_3$, so that $Al_2O_3$ is not present in the $WO_3$ layers. The addition of $Al_2O_3$ is effective for not only preventing cracking of the pellets to thereby minimize electrification but also preventing their splashing.

The water repellent layer constituting the top surface layer was formed by putting a porous material impregnated with a fluorinated silicone oil in the melt boat 13 for resistance heating and heating the same to effect evaporation of the oil component only. The optical thickness of the water repellent layer was about 3 nm, which was so small as to have no significant effect on optical characteristics. On the other hand, the contact angle of water in wetting was 97° ensuring satisfactory water repellency.

The reflection of the thus formed antireflection film was not greater than 1% in all the visible region, which ensured satisfactory performance in use.

In the conventional peeling test using a cellophane tape, film peeling did not occur, confirming a good adhesion between the substrate and the oxide layers.

The antireflection film was allowed to stand still in an atmosphere having a temperature of 45° C. and a humidity of 95% for 300 hours to determine changes in adhesion and optical characteristics. There were no changes, ensuring satisfactory moisture resistance.

For comparison, the same antireflection film as above except that the water repellent layer was not provided was formed, allowed to stand still in an atmosphere having a temperature of 45° C. and a humidity of 95% for 300 hours, and subjected to the peeling test. Peeling did occur.

EXAMPLE 15

Using the apparatus of FIG. 1, the antireflection film having the layer structure indicated in Table 11 was formed on the surface of a resin substrate of polymethyl methacrylate (PMMA) having a refractive index of 1.49, which film was composed of five alternate layers of $SiO_2$ and $MoO_3$, the layers being provided on their top with a water repellent layer having an optically noninfluential thickness.

In the film formation using the apparatus of FIG. 1, the $SiO_2$ and water repellent layers were formed in the same manner as in Example 14. On the other hand, the $MoO_3$ layers were formed by putting granules of $MoO_3$ in the boat 13 and evaporating the same while introducing oxygen gas up to a pressure of $1\times10^{-4}$ Torr.

The thus formed antireflection film had satisfactory optical characteristics and moisture resistance as in Example 14.

EXAMPLE 16

The antireflection film having the layer structure indicated in Table 12 was formed, which was the same as in Example 14 except that a polycarbonate (PC) substrate was used, and that a different water repellent layer was provided.

The water repellent layer constituting the top surface layer was formed as follows. After the formation of the 1st to 5th layers in the same manner as in Example 14, the resultant preliminary antireflection film was taken out from the chamber, and a 0.06% by weight dilution of a transparent fluororesin was applied thereto in an optical thickness of 10 nm by means of a spinner. Thereafter, the film was heated at 80° C. for 1 hr to thereby combine individually present monomers, so that a strong amorphous polymer layer was formed.

On the amorphous polymer layer, the contact angle of water in wetting was 92° ensuring satisfactory water repellency.

The reflection of the thus formed antireflection film was not greater than 1% in all the visible region, which ensured satisfactory performance in use. In the conventional peeling test using a cellophane tape, film peeling did not occur, confirming a good adhesion between the substrate and the oxide layers.

The antireflection film was allowed to stand still in an atmosphere having a temperature of 45° C. and a humidity of 95% for 300 hours to determine changes in adhesion and optical characteristics. There were no changes, ensuring satisfactory moisture resistance.

EXAMPLE 17

Using the apparatus of FIG. 1, the antireflection film having the layer structure indicated in Table 13 was formed on the surface of a substrate of an amorphous polyolefin resin having a refractive index of 1.53, which film was composed of four alternate layers of $SiO_2$ and $WO_3$, the layers being provided on their top with a water repellent layer having an optical thickness of 130 nm.

In the film formation using the apparatus of FIG. 1, the $SiO_2$ layers were formed in the same manner as in Example 14. On the other hand, the $WO_3$ layers were formed by putting granules of $WO_3$ in the boat 13 and evaporating the same while introducing oxygen gas up to a pressure of $5 \times 10^{-5}$ Torr.

The water repellent layer constituting the top surface layer was formed as follows. After the formation of the 1st to 4th layers, the resultant preliminary antireflection film was taken out from the chamber, and a 0.1% by weight dilution of a transparent fluororesin was applied thereto in an optical thickness of 130 nm by dipping. Thereafter, the film was heated at 90° C. for 1 hr to thereby combine individually present monomers, so that a strong amorphous polymer layer was formed.

On the amorphous polymer layer, the contact angle of water in wetting was 96° ensuring satisfactory water repellency.

The reflection of the thus formed antireflection film was not greater than 1% in all the visible region, which ensured satisfactory performance in use.

In the conventional peeling test using a cellophane tape, film peeling did not occur, confirming a good adhesion between the substrate and the oxide layers.

The antireflection film was allowed to stand still in an atmosphere having a temperature of 45° C. and a humidity of 95% for 300 hours to determine changes in adhesion and optical characteristics. There were no changes, ensuring satisfactory moisture resistance.

EXAMPLE 18

Figure 9:
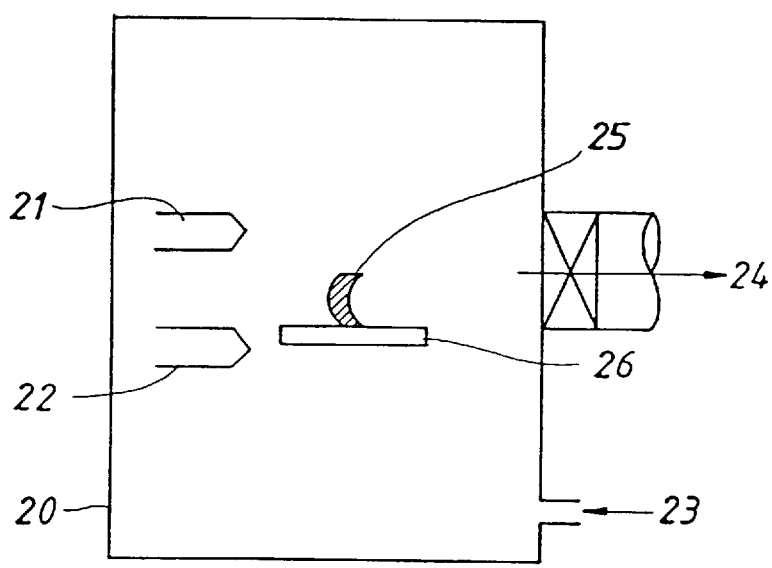
FIG. 9 is a schematic diagram of an apparatus for vacuum evaporation coating employed in Example 18.

Using the apparatus diagrammatically shown in FIGS. 1 and 9, the antireflection film having the layer structure indicated in Table 14 was formed on the surface of a UV-cured resin provided with a nonspherical modification, having a refractive index of 1.52, which was integrally disposed on a glass substrate. The antireflection film was composed of six layers each composed of SiO, $SiO_2$ or $WO_3$, the layers being provided on their top with a water repellent layer having an optically noninfluential thickness.

The $SiO_2$ and $WO_3$ layers were formed in the same manner as in Example 14, using the apparatus of FIG. 1.

Subsequently, after the formation of the 1st to 6th layers, the resultant preliminary antireflection film was taken out from the chamber of FIG. 1, and placed in the chamber of FIG. 9 to form a water repellent layer as a top surface layer, as follows.

In FIG. 9, numeral 20 denotes a vacuum chamber, in which electrodes 21, 22 for plasma generation and a gas inlet port 23 are disposed. Numeral 24 denotes a vacuum exhaust pipe connected to a vacuum pump not shown.

The preliminary antireflection film with the substrate 25 was mounted on a substrate holder 26, and the vacuum chamber 20 was evacuated to a pressure of $1 \times 10^{-3}$ Torr or less. Then, gasified fluorinated silicone was introduced thereinto through the gas inlet port 23, to which a high frequency was applied between the electrodes 21, 22 to produce plasma. As a result, individually present monomers were combined to thereby form a strong amorphous polymer layer having a thickness of about 2 to 3 nm as a top surface layer.

On this layer, the contact angle of water in wetting was 90° ensuring satisfactory water repellency.

The reflection of the thus formed antireflection film was not greater than 1% in all the visible region, which ensured satisfactory performance in use.

In the conventional peeling test using a cellophane tape, film peeling did not occur, confirming a good adhesion between the substrate and the oxide layers.

The antireflection film was allowed to stand still in an atmosphere having a temperature of 45° C. and a humidity of 95% for 300 hours to determine changes in adhesion and optical characteristics. There were no changes, ensuring satisfactory moisture resistance.

EXAMPLE 19

The above antireflection film having the layer structure indicated in Table 10 was formed by a different apparatus, i.e., a commercially available apparatus for vacuum evaporation coating having a vacuum chamber connected to a turbomolecular pump, the apparatus having no modification effected thereto. The vacuum chamber was evacuated to a pressure of $5 \times 10^{-4}$ Torr by means of the pump. Then, a mixture of argon and oxygen gases was fed into the vacuum chamber up to a pressure of $5 \times 10^{-3}$ Torr, at which the $WO_3$ and $SiO_2$ layers were formed by vacuum evaporation coating. Thus, the five-layer antireflection film was obtained.

The water repellent layer was provided in the same manner as in Example 14.

The resultant antireflection film also had desirable optical properties and moisture resistance as in Example 14.

EXAMPLE 20

An antireflection film was formed in the same manner as in Example 14, except that a substrate comprising CCD and, bonded thereto, a glass was used.

The resultant antireflection film also had desirable optical properties and moisture resistance as in Example 14. There was no adverse thermal effect on the CCD and bond interfaces, and the substrate had no thermal damage.

TABLE 10

Antireflection Film of Example 14

| | Material | Refractive index n | Optical film thickness nd [nm] |
|---|---|---|---|
| 6th layer | Water repellent layer | | 3 |
| 5th layer | $SiO_2$ | 1.46 | 120 |
| 4th layer | $WO_3$ | 2.05 | 260 |
| 3rd layer | $SiO_2$ | 1.46 | 50 |
| 2nd layer | $WO_3$ | 2.05 | 25 |
| 1st layer | $SiO_2$ | 1.46 | 20 |
| Substrate | PMMA | 1.49 | — |

TABLE 11

Antireflection Film of Example 15

| | Material | Refractive index n | Optical film thickness nd [nm] |
|---|---|---|---|
| 6th layer | Water repellent layer | | 3 |
| 5th layer | $SiO_2$ | 1.46 | 135 |
| 4th layer | $MoO_3$ | 2.00 | 110 |
| 3rd layer | $SiO_2$ | 1.46 | 40 |
| 2nd layer | $MoO_3$ | 2.00 | 65 |
| 1st layer | $SiO_2$ | 1.46 | 20 |
| Substrate | PMMA | 1.49 | — |

TABLE 12

Antireflection Film of Example 16

| | Material | Refractive index n | Optical film thickness nd [nm] |
|---|---|---|---|
| 6th layer | Water repellent layer | | 10 |
| 5th layer | $SiO_2$ | 1.46 | 130 |
| 4th layer | $WO_3$ | 2.05 | 280 |
| 3rd layer | $SiO_2$ | 1.46 | 50 |
| 2nd layer | $WO_3$ | 2.05 | 30 |
| 1st layer | $SiO_2$ | 1.46 | 8 |
| Substrate | PC | 1.58 | — |

TABLE 13

Antireflection Film of Example 17

| | Material | Refractive index n | Optical film thickness nd [nm] |
|---|---|---|---|
| 5th layer | Water repellent layer | 1.33 | 130 |
| 4th layer | $WO_3$ | 1.98 | 260 |
| 3rd layer | $SiO_2$ | 1.46 | 50 |
| 2nd layer | $WO_3$ | 1.98 | 25 |
| 1st layer | $SiO_3$ | 1.46 | 20 |
| Substrate | Amorphous polyolefin | 1.53 | — |

TABLE 14

Antireflection Film of Example 18

| | Material | Refractive index n | Optical film thickness nd [nm] |
|---|---|---|---|
| 7th layer | Water repellent layer | | 1 |
| 6th layer | $SiO_2$ | 1.46 | 120 |
| 5th layer | $WO_3$ | 2.05 | 265 |
| 4th layer | $SiO_2$ | 1.46 | 50 |
| 3rd layer | $WO_3$ | 2.05 | 25 |
| 2nd layer | $SiO_2$ | 1.46 | 10 |
| 1st layer | SiO | 1.55 | 2 |
| Substrate | UV-cured resin | 1.52 | — |

EXAMPLE 21

Figure 10:
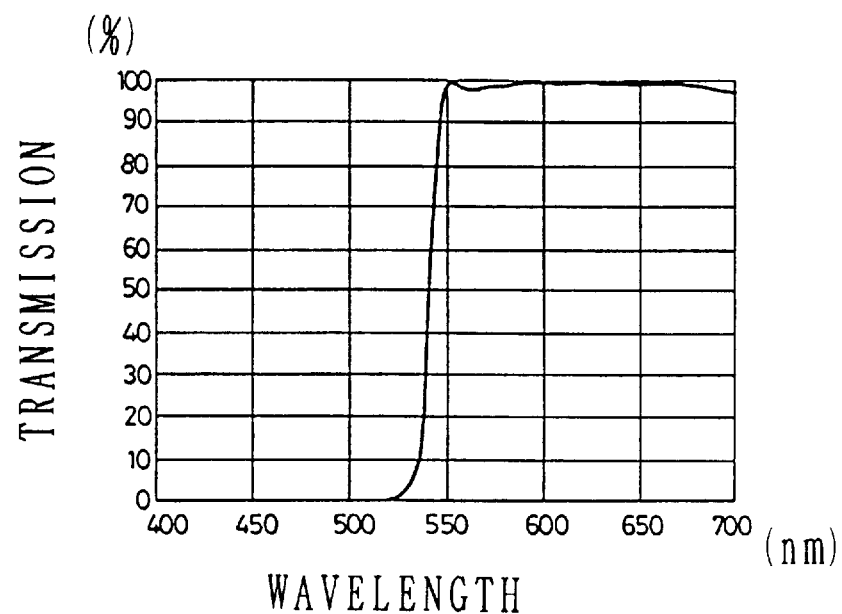
FIG. 10 is a graph showing the transmission of the edge filter of Example 21 according to the present invention as a function of wavelength.

A high pass filter cutting rays having wavelengths ranging from 400 nm to 520 nm while transmitting rays having wavelengths ranging from 550 nm to 700 nm as shown in FIG. 10 was formed in the following manner.

In the vacuum chamber of FIG. 1, a substrate of the acrylic resin having a thickness of 1 mm was disposed, and the vacuum chamber was evacuated to a pressure of $5\times10^{-5}$ Torr by means of the oil diffusion pump. As materials for the high pass filter, $MoO_3$ was used for forming high refractive index layers and $SiO_2$ was used for forming low refractive index layers. As many as 32 layers indicated in Table 15 were formed by evaporation coating in which electron beams were employed.

The transmission characteristics of the thus formed high pass filter are shown in FIG. 10, ensuring satisfactory performance in use.

The high pass filter exhibited a good adhesion between the substrate and the oxide layers, and cracking and adhesion deterioration did not occur in the heat cycle test.

EXAMPLE 22

Figure 11:
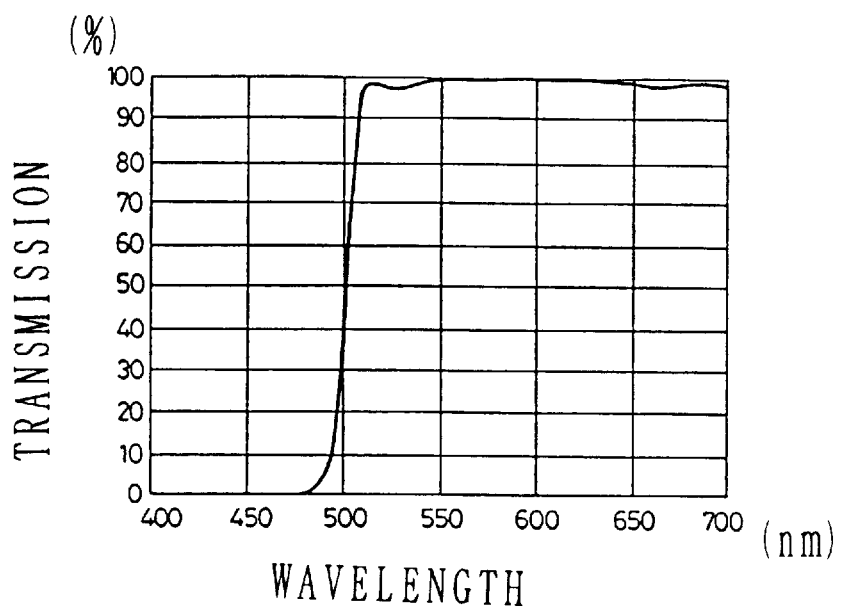
FIG. 11 is a graph showing the transmission of the edge filter of Example 22 according to the present invention as a function of wavelength.

A high pass filter cutting rays having wavelengths ranging from 400 nm to 480 nm while transmitting rays having wavelengths ranging from 520 nm to 700 nm as shown in FIG. 11 was formed in the following manner.

In the vacuum chamber of FIG. 1, a substrate of the acrylic resin having a thickness of 1 mm was disposed, and the vacuum chamber was evacuated to a pressure of $5\times10^{-5}$ Torr by means of the oil diffusion pump. As materials for the high pass filter, a mixture of $WO_3$ and $Al_2O_3$ (95:5 by weight) was used for forming high refractive index layers and $SiO_2$ was used for forming low refractive index layers. As many as 32 layers indicated in Table 16 were formed by evaporation coating in which electron beams were employed.

The transmission characteristics of the thus formed high pass filter are shown in FIG. 11, ensuring satisfactory performance in use.

The high pass filter exhibited a good adhesion between the substrate and the oxide layers, and cracking and adhesion deterioration did not occur in the heat cycle test.

EXAMPLE 23

Figure 12:
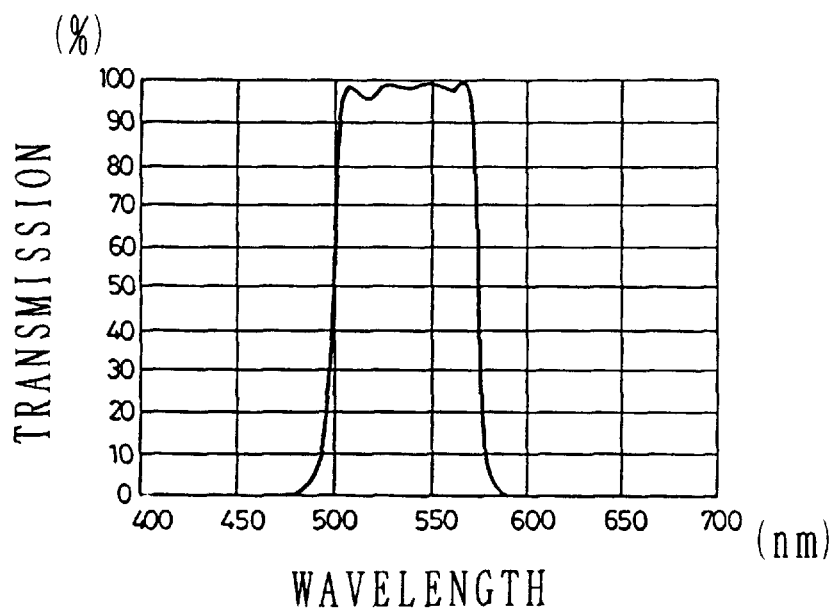
FIG. 12 is a graph showing the transmission of the edge filter of Example 23 according to the present invention as a function of wavelength.

A band pass filter cutting rays having wavelengths ranging from 400 nm to 470 nm and those ranging from 580 nm to 700 nm while transmitting rays having wavelengths ranging from 520 nm to 570 nm as shown in FIG. 12 was formed in the following manner.

In the vacuum chamber of FIG. 1, a substrate of the acrylic resin having a thickness of 1 mm was disposed, and the vacuum chamber was evacuated to a pressure of $5\times10^{-5}$ Torr by means of the oil diffusion pump. By electron beam evaporation coating, a high pass filter was produced comprising 32 layers formed on one side of the substrate as indicated in Table 17. The resultant filter was taken out, turned upside down, and again disposed in the vacuum chamber. By electron beam evaporation coating, a low pass filter was produced comprising 32 layers formed on the other side of the substrate as indicated in Table 17.

The transmission characteristics of the thus formed band pass filter are shown in FIG. 12, ensuring satisfactory performance in use.

The band pass filter exhibited a good adhesion between the substrate and the oxide layers, and cracking and adhesion deterioration did not occur in the heat cycle test.

EXAMPLE 24

Figure 13:
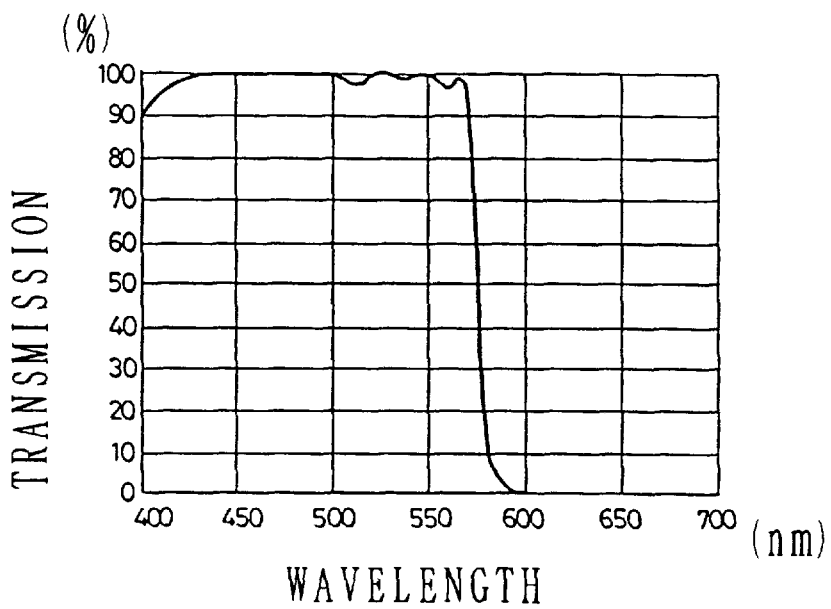
FIG. 13 is a graph showing the transmission of the edge filter of Example 24 according to the present invention as a function of wavelength.

A low pass filter transmitting rays having wavelengths ranging from 400 nm to 570 nm while cutting rays having wavelengths ranging from 590 nm to 700 nm as shown in FIG. 13 was formed in the following manner. In the vacuum chamber of FIG. 1, a substrate of the acrylic resin having a thickness of 1 mm was disposed, and the vacuum chamber was evacuated to a pressure of $5\times10^{-5}$ Torr by means of the oil diffusion pump. As materials for the low pass filter, $MoO_3$ was used for forming high refractive index layers and $SiO_2$ was used for forming low refractive index layers. As many as 32 layers indicated in Table 18 were formed by evaporation coating in which electron beams were employed.

The transmission characteristics of the thus formed low pass filter are shown in FIG. 13, ensuring satisfactory performance in use.

The low pass filter exhibited a good adhesion between the substrate and the oxide layers, and cracking and adhesion deterioration did not occur in the heat cycle test.

EXAMPLE 25

A low pass filter transmitting rays having wavelengths ranging from 400 nm to 550 nm while cutting rays having wavelengths ranging from 570 nm to 700 nm as shown in FIG. 14 was formed in the following manner. As materials for the low pass filter, $WO_3$ was used for forming high refractive index layers and $SiO_2$ was used for forming low refractive index layers. As many as 32 layers indicated in Table 19 were formed by evaporation coating in which electron beams were employed.

In the vacuum chamber of FIG. 9, an amorphous polyolefin substrate having a thickness of 1 mm was disposed, and the vacuum chamber was evacuated to a pressure of $5\times10^{-5}$ Torr by means of the turbomolecular pump. Then, argon gas was fed into the vacuum chamber up to a pressure of $5\times10^{-3}$ Torr, at which the $WO_3$ and $SiO_2$ layers were formed by vacuum evaporation coating.

The transmission characteristics of the thus formed low pass filter are shown in FIG. 14, ensuring satisfactory performance in use.

The low pass filter exhibited a good adhesion between the substrate and the oxide layers, and cracking and adhesion deterioration did not occur in the heat cycle test.

EXAMPLE 26

An IR cut filter transmitting rays having wavelengths ranging from 400 nm to 700 nm while cutting rays having wavelengths ranging from 890 nm to 1100 nm as shown in FIG. 15 was formed in the following manner.

In the vacuum chamber of FIG. 1, CCD as a substrate was disposed in the fashion that evaporation coating was conducted on a light receiving surface, and the vacuum chamber was evacuated to a pressure of $5\times10^{-5}$ Torr by means of the oil diffusion pump. As materials for the IR cut filter, $MoO_3$ was used for forming high refractive index layers and $SiO_2$ was used for forming low refractive index layers. As many as 32 layers indicated in Table 20 were formed by evaporation coating in which electron beams were employed.

The transmission characteristics of the thus formed IR cut filter are shown in FIG. 15, ensuring satisfactory performance in use.

The IR cut filter exhibited a good adhesion between the substrate and the oxide layers, and cracking and adhesion deterioration did not occur in the heat cycle test.

COMPARATIVE EXAMPLE 1

Figure 16:
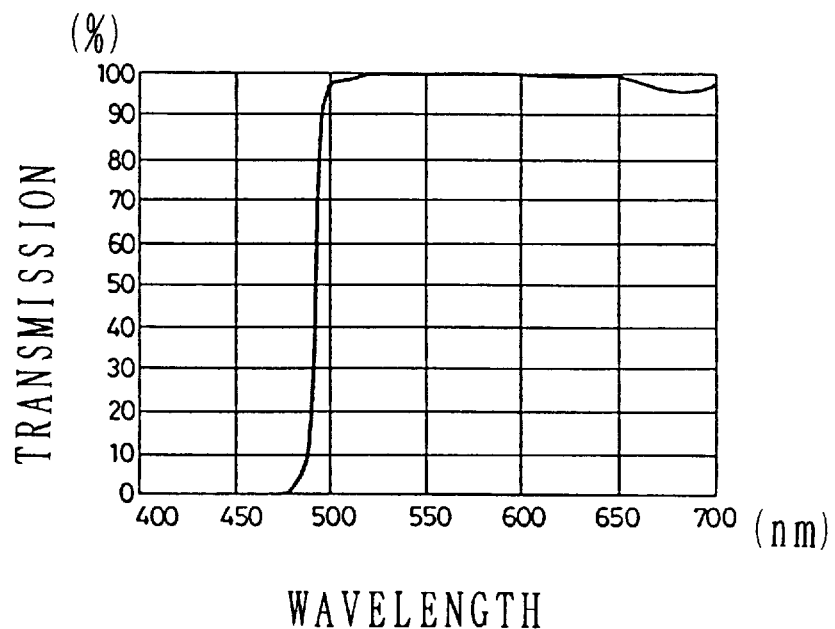
FIG. 16 is a graph showing the transmission of the edge filter of Comparative Example 1 as a function of wavelength.

A high pass filter cutting rays having wavelengths ranging from 400 nm to 480 nm while transmitting rays having wavelengths ranging from 500 nm to 700 nm as shown in FIG. 16 was formed in the following manner.

In the vacuum chamber of FIG. 1, a substrate of the acrylic resin having a thickness of 1 mm was disposed, and the vacuum chamber was evacuated to a pressure of $5\times10^{-5}$ Torr by means of the oil diffusion pump. As materials for the high pass filter, $TiO_3$ was used for forming high refractive index layers and $SiO_2$ was used for forming low refractive index layers. As many as 32 layers indicated in Table 21 were formed by evaporation coating in which electron beams were employed.

The transmission characteristics of the thus formed high pass filter are shown in FIG. 16, from which satisfactory performance in use was expected. However, in the adhesion test by tape peeling, peeling occurred, and cracking was observed upon 10 heat cycles in the heat cycle test.

COMPARATIVE EXAMPLE 2

Figure 17:
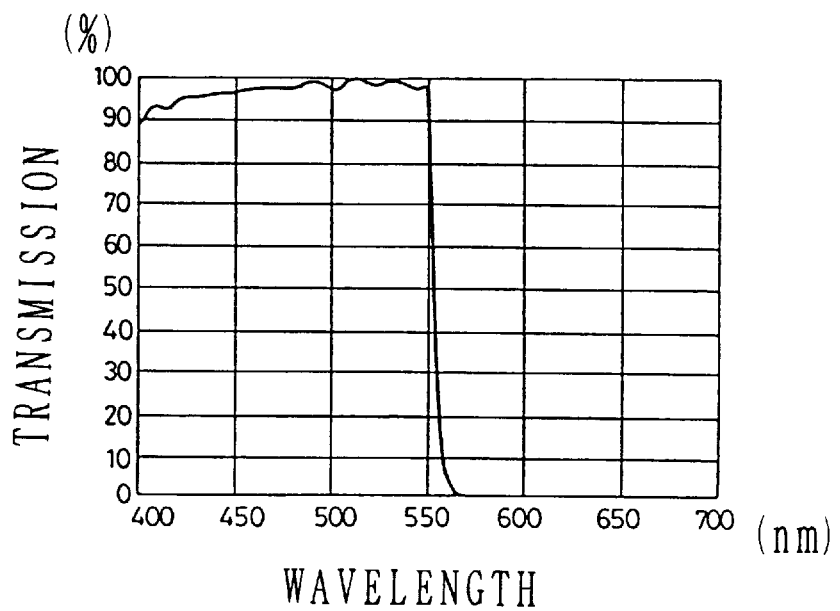
FIG. 17 is a graph showing the transmission of the edge filter of Comparative Example 2 as a function of wavelength.

A low pass filter transmitting rays having wavelengths ranging from 400 nm to 550 nm while cutting rays having wavelengths ranging from 570 nm to 700 nm as shown in FIG. 17 was formed in the following manner.

In the vacuum chamber of FIG. 1, a substrate of the acrylic resin having a thickness of 1 mm was disposed, and the vacuum chamber was evacuated to a pressure of $5\times10^{-5}$ Torr by means of the oil diffusion pump. As materials for the low pass filter, $TiO_3$ was used for forming high refractive index layers and $SiO_2$ was used for forming low refractive index layers. As many as 32 layers indicated in Table 22 were formed by evaporation coating in which electron beams were employed.

The transmission characteristics of the thus formed low pass filter are shown in FIG. 17, from which satisfactory performance in use was expected. However, in the adhesion test by tape peeling, peeling occurred, and cracking was observed upon 10 heat cycles in the heat cycle test.

TABLE 15

High Pass Filter of Example 21

$\lambda$ = 460 nm

| | | |
|---|---|---|
| 32nd layer | $MoO_3$ | 1.75 $\lambda$ |
| 31st layer | $SiO_2$ | 0.88 $\lambda$ |
| 30th layer | $MoO_3$ | $\lambda$ |
| 29th layer | $SiO_2$ | 0.88 $\lambda$ |
| 28th layer | $MoO_3$ | 0.9 $\lambda$ |
| 27th layer | $SiO_2$ | 0.9 $\lambda$ |
| | $MoO_3$ | $\lambda$ ⎤ |
| | | ⎥ 11 repetitions |
| | $SiO_2$ | $\lambda$ ⎦ |
| 4th layer | $MoO_3$ | 0.9 $\lambda$ |
| 3rd layer | $SiO_2$ | |
| 2nd layer | $MoO_3$ | 0.63 $\lambda$ |
| 1st layer | $SiO_2$ | 0.63 $\lambda$ |
| | Substrate (PMMA) | |

TABLE 16

High Pass Filter of Example 22

$\lambda$ = 440 nm

| | | |
|---|---|---|
| 32nd layer | $WO_3 + Al_2O_3$ | 1.75 $\lambda$ |
| 31st layer | $SiO_2$ | 0.88 $\lambda$ |
| 30th layer | $WO_3 + Al_2O_3$ | $\lambda$ |
| 29th layer | $SiO_2$ | 0.88 $\lambda$ |
| 28th layer | $WO_3 + Al_2O_3$ | 0.9 $\lambda$ |

TABLE 16-continued

High Pass Filter of Example 22

| 27th layer | SiO$_2$ | 0.9 λ | |
| | WO$_3$ + Al$_2$O$_3$ | | ⎤ |
| | | | ⎬ 11 repetitions |
| | SiO$_2$ | | ⎦ |
| 4th layer | WO$_3$ + Al$_2$O$_3$ | 0.9 λ | |
| 3rd layer | SiO$_2$ | 1.25 λ | |
| 2nd layer | WO$_3$ + Al$_2$O$_3$ | 0.63 λ | |
| 1st layer | SiO$_2$ | 0.63 λ | |
| | Substrate (PMMA) | | |

TABLE 17

Band Pass Filter of Example 23

On one side of the substrate λ = 425 nm

| 32nd layer | MoO$_3$ | 1.75 λ | |
| 31st layer | SiO$_2$ | 0.88 λ | |
| 30th layer | MoO$_3$ | λ | |
| 29th layer | SiO$_2$ | 0.88 λ | |
| 28th layer | MoO$_3$ | 0.9 λ | |
| 27th layer | SiO$_2$ | 0.9 λ | |
| | MoO$_3$ | λ | ⎤ |
| | | | ⎬ 11 repetitions |
| | SiO$_2$ | λ | ⎦ |
| 4th layer | MoO$_3$ | 0.9 λ | |
| 3rd layer | SiO$_2$ | 1.25 λ | |
| 2nd layer | MoO$_3$ | 0.63 λ | |
| 1st layer | SiO$_2$ | 0.63 λ | |
| | Substrate (PMMA) | | |

On the other side of the substrate λ = 645 nm

| 32nd layer | MoO$_3$ | 0.55 λ | |
| 31st layer | SiO$_2$ | λ | |
| 30th layer | MoO$_3$ | 1.09 λ | |
| 29th layer | SiO$_2$ | 1.04 λ | |
| 28th layer | MoO$_3$ | 1.05 λ | |
| | SiO$_2$ | λ | ⎤ |
| | | | ⎬ 11 repetitions |
| | MoO$_3$ | λ | ⎦ |
| 5th layer | SiO$_2$ | 1.06 λ | |
| 4th layer | MoO$_3$ | λ | |
| 3rd layer | SiO$_2$ | 1.11 λ | |
| 2nd layer | MoO$_3$ | 1.03 λ | |
| 1st layer | SiO$_2$ | 1.28 λ | |
| | Substrate (PMMA) | | |

TABLE 18

Low Pass Filter of Example 24

λ = 645 nm

| 32nd layer | MoO$_3$ | 0.55 λ | |
| 31st layer | SiO$_2$ | λ | |
| 30th layer | MoO$_3$ | 1.09 λ | |
| 29th layer | SiO$_2$ | 1.04 λ | |
| 28th layer | MoO$_3$ | 1.05 λ | |
| | SiO$_2$ | λ | ⎤ |
| | | | ⎬ 11 repetitions |
| | MoO$_3$ | λ | ⎦ |
| 5th layer | SiO$_2$ | 1.06 λ | |
| 4th layer | MoO$_3$ | λ | |
| 3rd layer | SiO$_2$ | 1.11 λ | |
| 2nd layer | MoO$_3$ | 1.03 λ | |
| 1st layer | SiO$_2$ | 1.28 λ | |
| | Substrate (PMMA) | | |

TABLE 19

Low Pass Filter of Example 25

λ = 640 nm

| 32nd layer | WO$_3$ | 0.55 λ | |
| 31st layer | SiO$_2$ | λ | |
| 30th layer | WO$_3$ | 1.09 λ | |
| 29th layer | SiO$_2$ | 1.04 λ | |
| 28th layer | WO$_3$ | 1.05 λ | |
| | SiO$_2$ | λ | ⎤ |
| | | | ⎬ 11 repetitions |
| | WO$_3$ | λ | ⎦ |
| 5th layer | SiO$_2$ | 1.06 λ | |
| 4th layer | WO$_3$ | λ | |
| 3rd layer | SiO$_2$ | 1.11 λ | |
| 2nd layer | WO$_3$ | 1.03 λ | |
| 1st layer | SiO$_2$ | 1.28 λ | |
| | Substrate (Amorphous polyolefin) | | |

TABLE 20

IR Cut Filter of Example 26

λ = 830 nm

| 32nd layer | MoO$_3$ | 0.55 λ | |
| | SiO$_2$ | 1.24 λ | ⎤ |
| | | | ⎬ 7 repetitions |
| | MoO$_3$ | 1.24 λ | ⎦ |
| 17th layer | SiO$_2$ | 1.19 λ | |
| 16th layer | MoO$_3$ | 1.14 λ | |
| 15th layer | SiO$_2$ | 1.12 λ | |
| | MoO$_3$ | λ | ⎤ |
| | | | ⎬ 11 repetitions |
| | SiO$_2$ | λ | ⎦ |
| 2nd layer | MoO$_3$ | 1.06 λ | |
| 1st layer | SiO$_2$ | 1.19 λ | |
| | Substrate (CCD) | | |

TABLE 21

High Pass Filter of Comparative Example 1

λ = 425 nm

| 32nd layer | TiO$_2$ | 1.75 λ | |
| 31st layer | SiO$_2$ | 0.88 λ | |
| 30th layer | TiO$_2$ | λ | |
| 29th layer | SiO$_2$ | 0.88 λ | |
| 28th layer | TiO$_2$ | 0.9 λ | |
| 27th layer | TiO$_2$ | 0.9 λ | |
| | TiO$_2$ | λ | ⎤ |
| | | | ⎬ 11 repetitions |
| | SiO$_2$ | λ | ⎦ |
| 4th layer | TiO$_2$ | 0.9 λ | |
| 3rd layer | SiO$_2$ | 1.25 λ | |
| 2nd layer | TiO$_2$ | 0.63 λ | |
| 1st layer | SiO$_2$ | 0.63 λ | |
| | Substrate (PMMA) | | |

TABLE 22

Low Pass Filter of Comparative Example 2

λ = 425 nm

| 32nd layer | TiO$_2$ | 0.55 λ |
| 31st layer | SiO$_2$ | λ |
| 30th layer | TiO$_2$ | 1.09 λ |
| 29th layer | SiO$_2$ | 1.04 λ |
| 28th layer | TiO$_2$ | 1.05 λ |

TABLE 22-continued

Low Pass Filter of Comparative Example 2

|  |  |  |  |
|---|---|---|---|
|  | $SiO_2$ | λ | ⎤ 11 repetitions |
|  | $TiO_2$ | λ | ⎦ |
| 5th layer | $SiO_2$ | 1.06 λ |  |
| 4th layer | $TiO_2$ | λ |  |
| 3rd layer | $SiO_2$ | 1.11 λ |  |
| 2nd layer | $TiO_2$ | 1.03 λ |  |
| 1st layer | $SiO_2$ | 1.28 λ |  |
|  |  | Substrate (PMMA) |  |

EXAMPLE 27

Referring to FIG. 18, a beam splitter (semi-transparent mirror) was produced by forming a half transmission film 32 on the surface of an amorphous polyolefin substrate 31 having a refractive index of 1.52, which film was composed of 13 alternate layers of $SiO_2$ and $WO_3$, with the layer adjacent to the substrate 31 being composed of $SiO_2$, as indicated in Table 23.

The above half transmission film 32 was formed on the substrate 31 using the apparatus for vacuum evaporation coating of FIG. 1, as follows.

The amorphous polyolefin substrate 31 was mounted on the rotary dome 15, and the vacuum chamber 10 was evacuated to a pressure of $1 \times 10^{-6}$ Torr by means of the oil diffusion pump. Each of the $SiO_2$ layers was formed by putting granules of $SiO_2$ in the copper crucibles with liner 14 and heating the same by the electron gun. On the other hand, each of the $WO_3$ layers was formed by heating pellets of $WO_3$ having a small amount (3% by weight) of $Al_2O_3$ added thereto by the electron gun to evaporate the same while introducing oxygen gas into the vacuum chamber 10 up to a pressure of $1 \times 10^{-5}$ Torr.

The vapor pressure of $Al_2O_3$ is far lower than that of $WO_3$, so that $Al_2O_3$ is not present in the $WO_3$ layers. The addition of $Al_2O_3$ is effective for not only preventing cracking of the pellets to thereby minimize electrification but also preventing their splashing.

The reflection of the thus formed beam splitter was about 50% in all the visible region, as shown in FIG. 19, which ensured satisfactory optical performance.

In the conventional adhesion test using a cellophane tape, peeling of the half transmission film 32 did not occur, confirming a good adhesion between the substrate and the oxide layers.

EXAMPLE 28

A water repellent layer was superimposed on the top surface of the beam splitter produced in Example 28 to obtain a beam splitter having the layer structure indicated in Table 24.

After the formation of the $SiO_2$ and $WO_3$ layers in the same manner as in Example 27, the water repellent layer was formed by putting a porous material impregnated with a fluorinated silicone oil in the melt boat 13 for resistance heating and heating the same to effect evaporation of the oil component only. The optical thickness of the water repellent layer was about 3 nm, which was so small as to have no significant effect on optical characteristics. On the other hand, the contact angle of water in wetting was 97° ensuring satisfactory water repellency.

In the conventional adhesion test using a cellophane tape, the thus formed beam splitter did not suffer from film peeling, confirming a good adhesion between the substrate and the oxide layers.

The beam splitter was allowed to stand still in an atmosphere having a temperature of 45° C. and a humidity of 95% for 300 hours to determine changes in adhesion and optical characteristics. There were no changes, ensuring satisfactory moisture resistance.

For comparison, the beam splitter of Example 27 having no water repellent layer was allowed to stand still in an atmosphere having a temperature of 45° C. and a humidity of 95% for 300 hours, and subjected to the adhesion test using the tape. Peeling of the half transmission film did occur. Therefore, it is found that the above superimposition of the water repellent layer is effective for improving the moisture resistance.

EXAMPLE 29

A beam splitter as illustrated in FIG. 20, having the layer structure indicated in Table 25, was produced as follows.

In the same manner as in Example 27, 13 alternate layers of $SiO_2$ and $WO_3$ were formed on the surface of a substrate of a triangular prism 33 of BK optical glass having a refractive index of 1.52 to thereby obtain a film 34 disposed on the prism substrate. Further, a triangular prism 35 was bonded to the top surface of the film 34 to obtain the desired beam splitter. In the bonding, a UV-curable adhesive having a viscosity of 300 cps was applied at a thickness of 10 μm.

Figure 21:
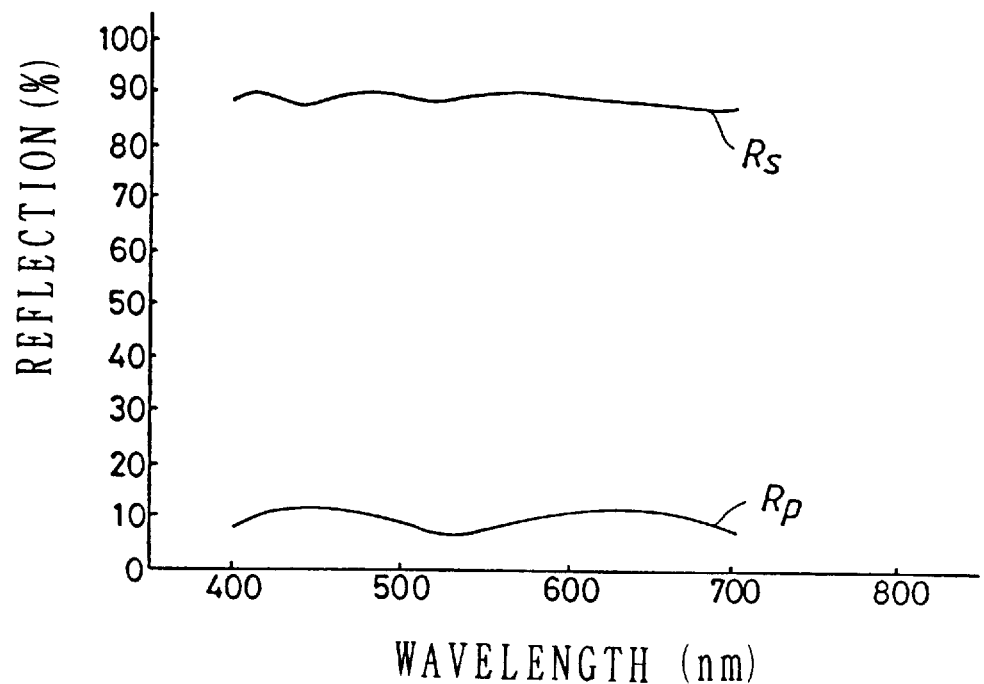
FIG. 21 is a graph showing the reflection of the beam splitter of Example 29 according to the present invention as a function of wavelength.

The resultant beam splitter had optical characteristics shown in FIG. 21, in which $R_s$ represents the reflection of polarized wave S and $R_p$ represents the reflection of polarized wave P.

EXAMPLE 30

The beam splitter having the layer structure indicated in Table 26 was produced, which comprised a prism of polymethyl methacrylate (PMMA) as a substrate and, superimposed thereon, a first layer of Ag, a second layer of $WO_3$ and another prism of polymethyl methacrylate in this order.

The Ag layer was formed by putting Ag wire chips in the boat composed of tungsten and evaporating the same by resistance heating. On the other hand, the layer of $WO_3$ was formed in the same manner as in Example 27. A UV-curable adhesive having a viscosity of 300 cps was applied at a thickness of 10 μm to bond the metal layer to the prism.

Figure 22:
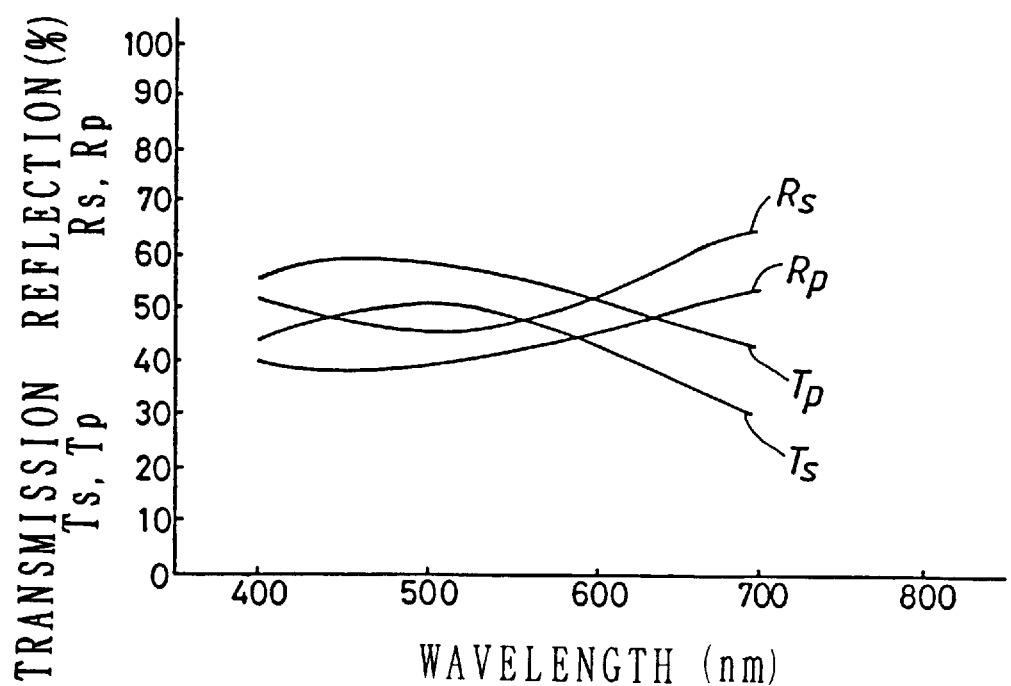
FIG. 22 is a graph showing the reflection and transmission of the beam splitter of Example 30 according to the present invention as a function of wavelength.

The resultant beam splitter had optical characteristics shown in FIG. 22, in which $R_s$ represents the reflection of polarized wave S and $R_p$ represents the reflection of polarized wave P.

PMMA having poor heat resistance was used as the substrate, but the substrate did not suffer from surface precision deterioration or other thermal damages.

EXAMPLE 31

The beam splitter having the layer structure indicated in Table 27 was produced, which comprised a prism of BK optical glass having a refractive index of 1.52 as a substrate and, superimposed thereon, three layers respectively composed of $WO_3$, Ag and a mixture of $ZrO_2$ and $TiO_2$ and another prism of the same glass in this order. A silicone condensation type adhesive having a viscosity of 300 cps was applied at a thickness of 10 μm to bond the metal layer to the prism.

The layers of $WO_3$ and the mixture of $ZrO_2$ and $TiO_2$ were formed by the vacuum evaporation coating in which evaporation coating materials of $WO_3$ and a sintered 9:1 by weight mixture of $ZrO_2$ and $TiO_2$, respectively, were evaporated while introducing argon and oxygen gases into the vacuum chamber 10 up to a total pressure of $7\times10^{-4}$ Torr. On the other hand, the layer of Ag was formed by the vacuum evaporation coating in which an evaporation coating material of Ag was evaporated while introducing argon gas into the vacuum chamber 10 up to a total pressure of $2\times10^{-4}$ Torr.

Figure 23:
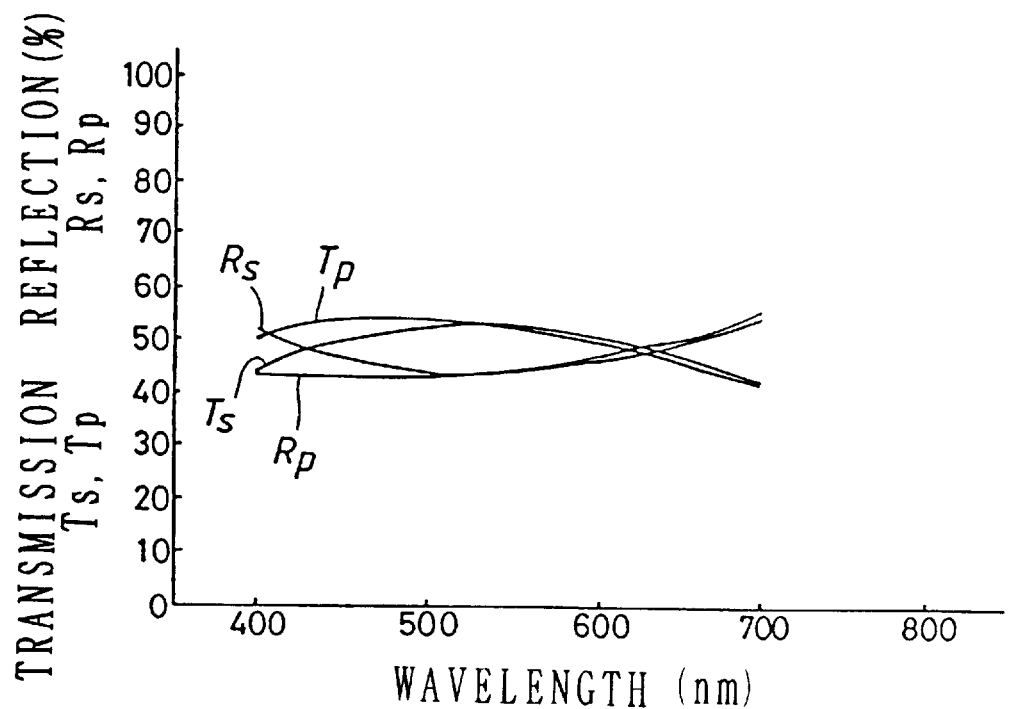
FIG. 23 is a graph showing the reflection and transmission of the beam splitter of Example 31 according to the present invention as a function of wavelength.

The resultant beam splitter had optical characteristics shown in FIG. 23.

EXAMPLE 32

The beam splitter having the layer structure indicated in Table 28 was produced, which comprised a prism of an amorphous polyolefin resin as a substrate and, superimposed thereon, five layers respectively composed of $SiO_2$, $WO_3$, Ag, $WO_3$ and $SiO_2$ and another prism of the same resin in this order.

Figure 24:
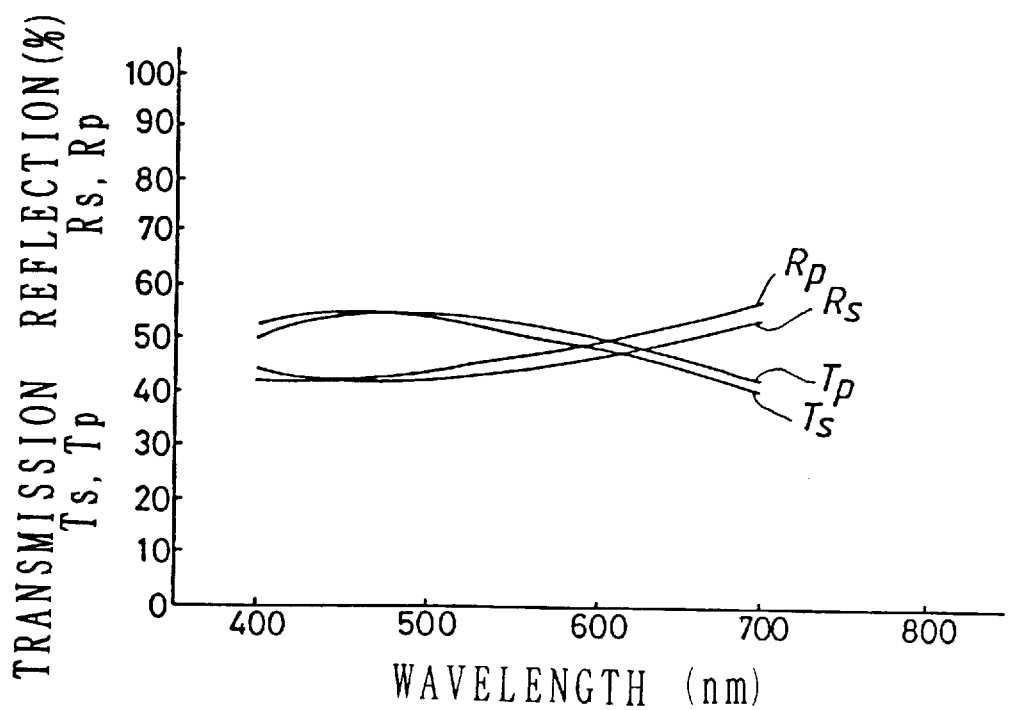
FIG. 24 is a graph showing the reflection and transmission of the beam splitter of Example 32 according to the present invention as a function of wavelength.

The resultant beam splitter had optical characteristics shown in FIG. 24.

A heat cycle test was conducted of the thus formed beam splitter. No problems of cracking and peeling occurred irrespective of 20 heat cycles each comprising holding at $-40°$ C. for 1 hr, at $20°$ C. for 30 min, at $80°$ C. for 1 hr and at $20°$ C. for 30 min.

For comparison, beam splitters having the same layer structure as above except that the first layer of $SiO_2$ was not provided or the thickness of the first layer was varied as indicated in Table 29 were formed, and subjected to the heat cycle test. The results are shown in Table 29.

From the results, it is found that the effect of preventing cracking is exerted when the thickness of the first layer of $SiO_2$ is 2 nm or greater, and that the effect is remarkable when the thickness is at least 5 nm.

This was true not only in this Example but also with respect to other layer structures.

The effect attained by the layer of $SiO_2$ was also attained by the layer of $SiO_x$ (wherein x is from 1 to 2).

EXAMPLE 33

The beam splitter having the layer structure indicated in Table 30 was produced, which comprised a prism of polycarbonate (PC) and, superimposed thereon, four layers respectively composed of $SiO_x$ (wherein x is from 1 to 2), $MoO_3$, Ag and $MoO_3$ and another prism of an amorphous polyolefin in this order.

Figure 25:
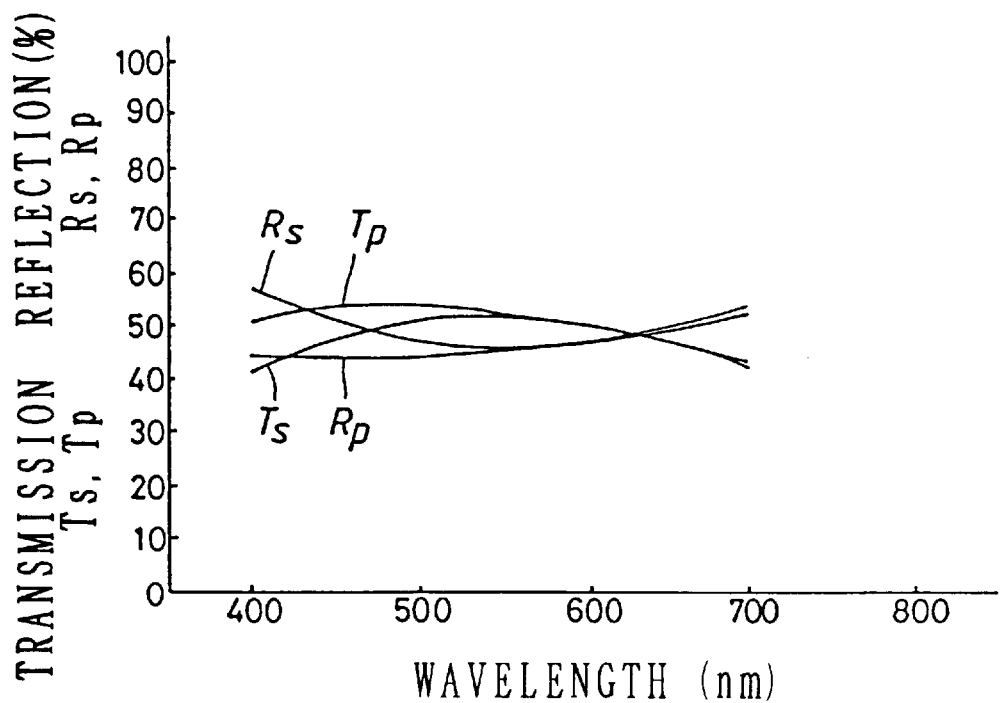
FIG. 25 is a graph showing the reflection and transmission of the beam splitter of Example 33 according to the present invention as a function of wavelength.

The resultant beam splitter had optical characteristics shown in FIG. 25, and exhibited excellent heat cycle resistance.

EXAMPLE 34

The beam splitter having the layer structure indicated in Table 31, exhibiting a transmission of 20%, was produced, which comprised a prism of an amorphous polyolefin resin as a substrate and, superimposed thereon, three layers respectively composed of $WO_3$, Ag and $WO_3$ and another prism of the same resin in this order.

Figure 26:
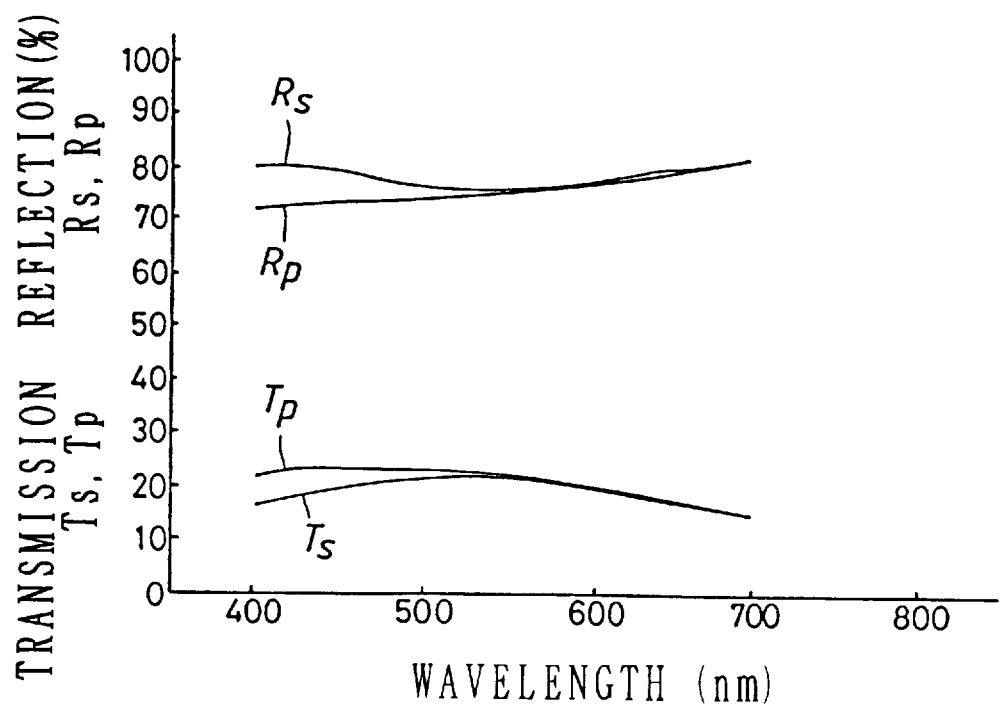
FIG. 26 is a graph showing the reflection and transmission of the beam splitter of Example 34 according to the present invention as a function of wavelength.

The resultant beam splitter had optical characteristics shown in FIG. 26, such that a transmission of about 20% was obtained with respect to each of polarized waves S and P.

EXAMPLE 35

A beam splitter was produced, comprising a half transmission film having the layer structure indicated in Table 32.

The half transmission film comprised an amorphous polyolefin resin substrate having a refractive index of 1.52 and, superimposed thereon, 13 alternate layers of $SiO_2$ and $MoO_3$, with the layer adjacent to the substrate being composed of $SiO_2$ and with the topmost layer of $SiO_2$ being covered with a water repellent layer. The material and method for forming the water repellent layer were as in Example 28.

Figure 27:
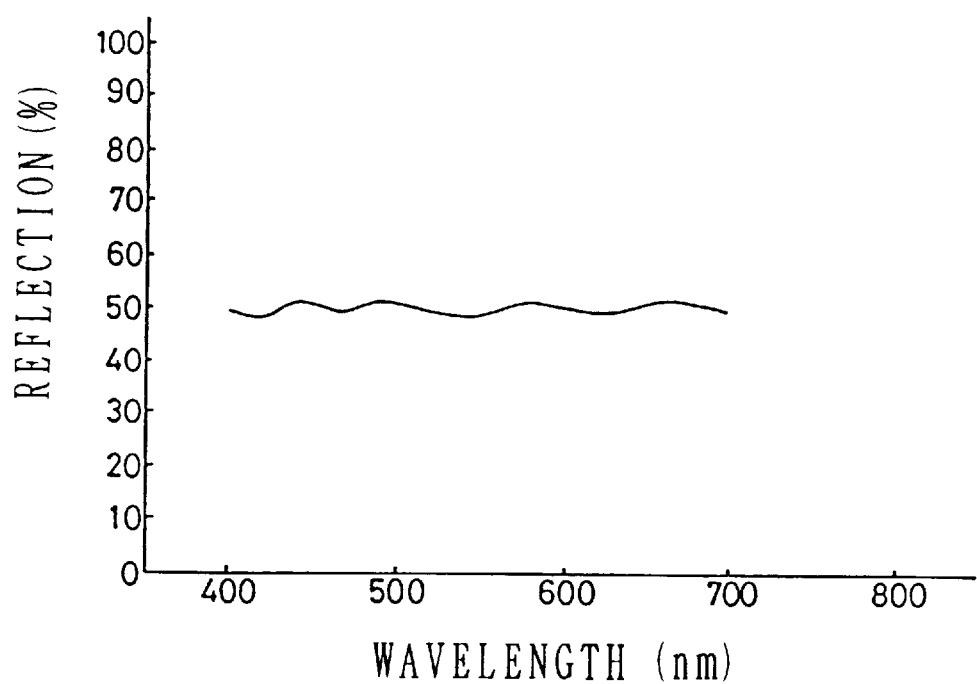
FIG. 27 is a graph showing the reflection of the beam splitter of Example 35 according to the present invention as a function of wavelength.

The resultant beam splitter had optical characteristics shown in FIG. 27.

In the conventional adhesion test using a cellophane tape, the thus formed beam splitter did not suffer from film peeling, confirming a good adhesion between the substrate and the oxide layers.

The beam splitter was allowed to stand still in an atmosphere having a temperature of $45°$ C. and a humidity of 95% for 300 hours to determine changes in adhesion and optical characteristics. There were no changes, ensuring satisfactory moisture resistance.

TABLE 23

Beam Splitter of Example 27

|  | Material | Optical film thickness nd |
|---|---|---|
| 13 | $SiO_2$ | 590 nm |
| 12 | $WO_3$ | 1300 |
| 11 | $SiO_2$ | 1130 |
| 10 | $WO_3$ | 490 |
| 9 | $SiO_2$ | 960 |
| 8 | $WO_3$ | 630 |
| 7 | $SiO_2$ | 720 |
| 6 | $WO_3$ | 490 |
| 5 | $SiO_2$ | 680 |
| 4 | $WO_3$ | 340 |
| 3 | $SiO_2$ | 420 |
| 2 | $WO_3$ | 510 |
| 1 | $SiO_2$ | 30 |
| Substrate |  | Amorphous polyolefin |

TABLE 24

Beam Splitter of Example 28

|  | Material | |
|---|---|---|
| 14 | Water repellent layer | |
| 13 | $SiO_2$ | 590 nm |
| 12 | $WO_3$ | 1300 |
| 11 | $SiO_2$ | 1130 |
| 10 | $WO_3$ | 490 |
| 9 | $SiO_2$ | 960 |
| 8 | $WO_3$ | 630 |
| 7 | $SiO_2$ | 720 |
| 6 | $WO_3$ | 490 |
| 5 | $SiO_2$ | 680 |
| 4 | $WO_3$ | 340 |
| 3 | $SiO_2$ | 420 |
| 2 | $WO_3$ | 510 |
| 1 | $SiO_2$ | 30 |
| Substrate |  | Amorphous polyolefin |

TABLE 25

Beam Splitter of Example 29

|  | Material | Optical film thickness nd |
|---|---|---|
| 13 | $SiO_2$ | nd = 1100 nm |
| 12 | $WO_3$ | 1050 |
| 11 | $SiO_2$ | 790 |
| 10 | $WO_3$ | 910 |
| 9 | $SiO_2$ | 920 |

TABLE 25-continued

Beam Splitter of Example 29

| | Material | Optical film thickness nd |
|---|---|---|
| 8 | $WO_3$ | 620 |
| 7 | $SiO_2$ | 750 |
| 6 | $WO_3$ | 590 |
| 5 | $SiO_2$ | 730 |
| 4 | $WO_3$ | 480 |
| 3 | $SiO_2$ | 480 |
| 2 | $WO_3$ | 480 |
| 1 | $SiO_2$ | 30 |
| Substrate | Optical BK glass | |

TABLE 26

Beam Splitter of Example 30

| | Material | Optical film thickness nd |
|---|---|---|
| Substrate | PMMA | — |
| 2 | $WO_3$ | nd = 57 nm |
| 1 | Ag | nd = 20 nm |
| Substrate | PMMA | — |

TABLE 27

Beam Splitter of Example 31

| | Material | Optical film thickness nd |
|---|---|---|
| Substrate | Optical BK glass | — |
| 3 | $ZrO_2 + TiO_2$ | nd = 50 nm |
| 2 | Ag | nd = 21 nm |
| 1 | $WO_3$ | nd = 87 nm |
| Substrate | Optical BK glass | — |

TABLE 28

Beam Splitter of Example 32

| Substrate | | Amorphous polyolefin |
|---|---|---|
| 5 | $SiO_2$ | nd = 20 nm |
| 4 | $WO_3$ | nd = 42 |
| 3 | Ag | nd = 21 |
| 2 | $WO_3$ | nd = 89 |
| 1 | $SiO_2$ | nd = 10 |
| Substrate | | Amorphous polyolefin |

TABLE 29

Beam Splitter of Example 32

| Optical film thickness nd (nm) of 1st layer ($SiO_2$) | | Appearance after heat cycle test |
|---|---|---|
| 0 | X | Visually observable cracks occured on the film. |
| 1.0 nm | X | Visually observable cracks occured on the film. |
| 1.7 | X | Visually observable cracks occured on the film. |
| 2.0 | Δ | Cracks observable by an optical microscope occurred, but optically there is no problem. |
| 3.0 | Δ | Cracks observable by an optical microscope |

TABLE 29-continued

Beam Splitter of Example 32

| Optical film thickness nd (nm) of 1st layer ($SiO_2$) | | Appearance after heat cycle test |
|---|---|---|
| | | occurred, but optically there is no problem. |
| 5 | ○ | No cracks. |
| 10 | ○ | " |
| 40 | ○ | " |

TABLE 30

Beam Splitter of Example 33

| Substrate | | Amorphous polyolefin |
|---|---|---|
| 4 | $MoO_3$ | nd = 93 nm |
| 3 | Ag | nd = 21 |
| 2 | $MoO_3$ | nd = 50 |
| 1 | $SiO_x$ | nd = 7 |
| Substrate | | PC |

TABLE 31

Beam Splitter of Example 34

| Substrate | | Amorphous polyolefin |
|---|---|---|
| 3 | $WO_3$ | nd = 91 nm |
| 2 | Ag | nd = 35 |
| 1 | $WO_3$ | nd = 53 |
| Substrate | | Amorphous polyolefin |

TABLE 32

Beam Splitter of Example 35

| | | Optical film thickness nd |
|---|---|---|
| 14 | Water repellent layer | 3 nm |
| 13 | $SiO_2$ | 120 |
| 12 | $MoO_3$ | 420 |
| 11 | $SiO_2$ | 250 |
| 10 | $MoO_3$ | 120 |
| 9 | $SiO_2$ | 220 |
| 8 | $MoO_3$ | 170 |
| 7 | $SiO_2$ | 150 |
| 6 | $MoO_3$ | 120 |
| 5 | $SiO_2$ | 150 |
| 4 | $MoO_3$ | 100 |
| 3 | $SiO_2$ | 120 |
| 2 | $MoO_3$ | 120 |
| 1 | $SiO_2$ | 20 |
| Substrate | | Amorphous polyolefin |

What is claimed is:

1. An optical thin film for an optical element, said film being disposed on a resin substrate as an optical part, said film comprising: a layer of a silicon oxide having at least 2 nm thickness and disposed on the substrate, and superimposed on the silicon oxide layer one of a compound containing $WO_3$ or $MoO_3$, and one layer of $SiO_2$.

2. An optical thin film for an optical element, said thin film being formed on a substrate as an optical part, and comprising: at least one layer containing at least one compound selected from the group consisting of $MoO_3$ and $WO_3$ disposed on the substrate by vacuum evaporation coating, and a top surface layer of fluorinated polymer having a water repellant effect.

3. The optical thin film according to claim 2, wherein said thin film is an antireflection film for use in optical parts.

4. The optical thin film according to claim 2, wherein said thin film is used as a beam splitter.

5. The optical thin film according to claim 2, wherein said fluorinated polymer is at least one member selected from the group consisting of polytetrafluoroethylene (PTFE), polyfluoroalkyl methacrylates, polytrifluoroethylene, perfluoroalkylsilane polymers and perfluoroalkylacetylene polymers.

6. An optical thin film for an optical element, said film being disposed on a resin substrate as an optical part, said film comprising: a layer of a silicon oxide having at least 2 nm thickness and disposed on the substrate, and superimposed on the silicon oxide layer at least one layer of a compound containing $WO_3$ or $MoO_3$, and at least one layer of $SiO_2$, which are disposed one upon the other, said film being used as a filter selected from the group consisting of high pass filters, band-pass filters and an IR cut filter and other low pass filters.

7. An optical thin film for an optical element, said film being disposed on a resin substrate as an optical part, said film comprising: a layer of a silicon oxide having at least 2 nm thickness and disposed on the substrate and a top layer of $SiO_2$, and interposed therebetween at least two layers including at least one layer of a compound containing $WO_3$ or $MoO_3$, and at least one layer of $SiO_2$, said film being used as a beam splitter.

8. An optical thin film for an optical element, said film being disposed on a resin substrate as an optical part, said film comprising: a layer of a silicon oxide having at least 2 nm disposed on the substrate, and superimposed on the silicon oxide layer a laminate of layers including at least one layer of a compound containing $WO_3$ or $MoO_3$, and at least one layer of $SiO_2$, which are disposed one upon the other, and superimposed thereon a top layer of $SiO_2$, said film being used as an antireflection film.

9. An optical thin film for an optical element, said thin film being disposed on a resin substrate as an optical part, and comprising: a first layer of a silicon oxide having an optical thickness of at least 2 nm disposed on the substrate and a top surface layer of a fluorinated polymer having water repellent effect, and interposed therebetween at least one layer containing at least one compound selected from the group consisting of $MoO_3$ and $WO_3$.

10. The optical thin film according to claim 9, wherein said top surface layer having water repellent effect is formed by evaporating only oil components from a fluorinated silicone oil.

11. An optical thin film for an optical element, said film being disposed on a resin substrate as an optical part, said film comprising:

a layer of a silicon oxide having at least 2 nm thickness and disposed on the substrate and a top layer of $SiO_2$, and interposed therebetween at least three layers including at least one layer of a compound containing $WO_3$ or $MoO_3$, at least one layer of $SiO_2$, and a layer of Ag, said film being used as a beam splitter.

* * * * *